(12) United States Patent
Alanqari et al.

(10) Patent No.: US 11,370,956 B2
(45) Date of Patent: Jun. 28, 2022

(54) EPOXY-BASED LCM COMPOSITIONS WITH CONTROLLED VISCOSITY AND METHODS OF TREATING A LOST CIRCULATION ZONE OF A WELLBORE

(71) Applicant: Saudi Arabian Oil Company, Dhahran (SA)

(72) Inventors: Khawlah A. Alanqari, Al-Khubar (SA); Abdullah Al-Yami, Dhahran (SA); Vikrant Wagle, Abqaiq (SA); Ali Alsafran, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 204 days.

(21) Appl. No.: 16/718,784

(22) Filed: Dec. 18, 2019

(65) Prior Publication Data

US 2021/0189219 A1  Jun. 24, 2021

(51) Int. Cl.
| | | |
|---|---|---|
| *C09K 8/508* | (2006.01) | |
| *C08L 63/00* | (2006.01) | |
| *E21B 21/00* | (2006.01) | |
| *E21B 33/138* | (2006.01) | |
| *C09K 8/504* | (2006.01) | |

(52) U.S. Cl.
CPC .......... *C09K 8/5086* (2013.01); *C08L 63/00* (2013.01); *C09K 8/5045* (2013.01); *E21B 21/003* (2013.01); *E21B 33/138* (2013.01)

(58) Field of Classification Search
CPC ..... C09K 8/5086; C09K 8/5045; C08L 63/00; E21B 21/003; E21B 33/138
See application file for complete search history.

(56) References Cited

U.S. PATENT DOCUMENTS

| | | |
|---|---|---|
| 602,375 A | 4/1898 | Suydam |
| 3,250,330 A | 5/1966 | Smith, Jr. |
| 3,476,189 A | 11/1969 | Cornelis et al. |
| 3,565,176 A | 2/1971 | Wittenwyler |
| 3,646,999 A | 3/1972 | Hamby, Jr. et al. |
| 3,915,232 A | 10/1975 | Gruesbeck |
| 4,003,873 A | 1/1977 | Smith |
| 4,042,032 A | 8/1977 | Anderson et al. |
| 4,072,194 A | 2/1978 | Cole et al. |
| 4,199,484 A | 4/1980 | Murphey |
| 4,247,430 A | 1/1981 | Constien |
| 4,665,988 A | 5/1987 | Murphey et al. |
| 4,730,675 A | 3/1988 | Wygant et al. |
| 4,749,042 A | 6/1988 | Wu |
| 4,799,553 A | 1/1989 | Wu |
| 5,178,218 A | 1/1993 | Dees |
| 5,712,314 A | 1/1998 | Surles et al. |
| 5,770,657 A | 6/1998 | Chou et al. |
| 5,873,413 A | 2/1999 | Chatterji et al. |
| 5,875,844 A | 3/1999 | Chatterji et al. |
| 5,875,845 A | 3/1999 | Chatterji et al. |
| 5,911,282 A | 6/1999 | Onan et al. |
| 5,959,061 A | 9/1999 | Neumann et al. |
| 6,016,870 A | 1/2000 | Dewprashad et al. |
| 6,124,246 A | 9/2000 | Heathman et al. |
| 6,196,316 B1 | 3/2001 | Bosma et al. |
| 6,234,251 B1 | 5/2001 | Chatterji et al. |
| 6,271,181 B1 | 8/2001 | Chatterji et al. |
| 6,316,529 B1 | 11/2001 | Temme et al. |
| 6,321,841 B1 | 11/2001 | Eoff et al. |
| 6,328,106 B1 | 12/2001 | Griffith et al. |
| 6,448,206 B1 | 9/2002 | Griffith et al. |
| 6,450,260 B1 | 9/2002 | James et al. |
| 6,478,088 B1 | 11/2002 | Hansen et al. |
| 6,802,375 B2 | 10/2004 | Bosma et al. |
| 6,837,316 B2 | 1/2005 | Reddy et al. |
| 6,880,642 B1 | 4/2005 | Garrett et al. |
| 7,673,686 B2 | 3/2010 | Nguyen et al. |
| 7,762,329 B1 | 7/2010 | Morgan et al. |
| 7,926,591 B2 | 4/2011 | Nguyen et al. |

(Continued)

FOREIGN PATENT DOCUMENTS

| | | |
|---|---|---|
| CA | 2709646 A1 | 7/2009 |
| CN | 101451061 A | 6/2009 |

(Continued)

OTHER PUBLICATIONS

U.S. Office Action dated Jul. 23, 2021 pertaining to U.S. Appl. No. 16/718,716, filed Dec. 18, 2019, 28 pages.
Notice of Allowance and Fee(s) Due dated Aug. 12, 2021 pertaining to U.S. Appl. No. 16/117,974, filed Aug. 30, 2018, 14 pages.
Notice of Allowance and Fee(s) Due dated Aug. 3, 2021 pertaining to U.S. Appl. No. 16/826,989, filed Mar. 23, 2020, 14 pages.
Notice of Allowance and Fee(s) Due dated Aug. 5, 2021 pertaining to U.S. Appl. No. 16/829,470, filed Mar. 25, 2020, 12 pages.
Office Action dated Feb. 18, 2021 pertaining to U.S. Appl. No. 16/718,716, filed Dec. 18, 2019, 66 pgs.
Notice of Allowance and Fee(s) Due dated Dec. 10, 2020 pertaining to U.S. Appl. No. 16/809,892, filed Mar. 5, 2020, 14 pgs.

(Continued)

*Primary Examiner* — Crystal J. Lee
(74) *Attorney, Agent, or Firm* — Dinsmore & Shohl LLP

(57) ABSTRACT

Lost circulation material (LCM) compositions for sealing lost circulation zones in wellbores may include an epoxy resin, a curing agent, an amide accelerator, and calcium carbonate having an average particle size of from 1,000 microns to 10,000 micron. The epoxy resin includes at least one of 2,3-epoxypropyl-o-tolyl ether, C12-C14 alkyl glycidyl ether, 1,6-hexanediol diglycidyl ether, butyl glycidyl ether, or cyclohexanedimethanol diglycidyl ether. The epoxy resin can also include bisphenol-A-epichlorohydrin epoxy resin. Methods of treating a lost circulation zone of a wellbore include injecting the LCM compositions into the lost circulation zone and curing the LCM compositions, where the LCM compositions include an epoxy resin, a curing agent, an amide accelerator, and calcium carbonate having an average particle size of from 1,000 microns to 10,000 microns.

19 Claims, No Drawings

(56) References Cited

U.S. PATENT DOCUMENTS

| | | |
|---|---|---|
| 7,956,017 B2 | 6/2011 | Gatlin et al. |
| 7,975,764 B2 | 7/2011 | Sullivan et al. |
| 8,157,009 B2 | 4/2012 | Patil et al. |
| 8,235,116 B1 | 8/2012 | Burts, Jr. et al. |
| 8,273,426 B1 | 9/2012 | Laramay et al. |
| 8,307,899 B2 | 11/2012 | Brenneis et al. |
| 8,664,285 B2 | 3/2014 | Bimbrich et al. |
| 8,789,595 B2 | 7/2014 | Guerrero et al. |
| 8,857,515 B2 | 10/2014 | Weaver |
| 8,936,087 B2 | 1/2015 | Nguyen et al. |
| 8,944,164 B2 | 2/2015 | Veldman et al. |
| 8,946,130 B2 | 2/2015 | Zamora et al. |
| 9,150,775 B2 | 10/2015 | Ostvold |
| 9,321,953 B1 | 4/2016 | Ferrell, Jr. et al. |
| 9,410,066 B2 | 8/2016 | Ghassemzadeh |
| 9,701,885 B2 | 7/2017 | Husein et al. |
| 9,828,293 B2 | 11/2017 | Yadav et al. |
| 9,902,891 B2 | 2/2018 | Hundt et al. |
| 9,932,510 B2 | 4/2018 | Walker et al. |
| 10,005,930 B2 | 6/2018 | Reddy |
| 10,081,755 B2 | 9/2018 | Ballard |
| 10,138,405 B2 | 11/2018 | Kulkarni et al. |
| 10,144,858 B2 | 12/2018 | Kennedy et al. |
| 2001/0035111 A1 | 11/2001 | Gienau et al. |
| 2002/0020530 A1 | 2/2002 | Griffith et al. |
| 2006/0219405 A1 | 10/2006 | Nguyen et al. |
| 2007/0093393 A1* | 4/2007 | Navarrete ............. C09K 23/16 507/131 |
| 2007/0102156 A1 | 5/2007 | Nguyen et al. |
| 2008/0110624 A1 | 5/2008 | Nguyen et al. |
| 2008/0277117 A1 | 11/2008 | Burts, Jr. et al. |
| 2010/0326660 A1 | 12/2010 | Ballard et al. |
| 2011/0088916 A1 | 4/2011 | Heijnen |
| 2011/0203795 A1 | 8/2011 | Murphy et al. |
| 2011/0284247 A1 | 11/2011 | Zamora et al. |
| 2011/0308799 A1 | 12/2011 | Tarafdar et al. |
| 2012/0328377 A1 | 12/2012 | Brenneis et al. |
| 2013/0008654 A1 | 1/2013 | Deville et al. |
| 2013/0105162 A1 | 5/2013 | Abad et al. |
| 2013/0178590 A1 | 7/2013 | Jin et al. |
| 2013/0292116 A1 | 11/2013 | Nguyen et al. |
| 2014/0027116 A1 | 1/2014 | Suresh et al. |
| 2014/0076563 A1 | 3/2014 | Lin et al. |
| 2014/0083702 A1 | 3/2014 | Godfrey et al. |
| 2014/0367105 A1 | 12/2014 | Karcher et al. |
| 2015/0152708 A1 | 6/2015 | Smith |
| 2015/0167424 A1 | 6/2015 | Richards et al. |
| 2015/0232719 A1 | 8/2015 | Pfeil et al. |
| 2016/0046853 A1 | 2/2016 | Chatterji et al. |
| 2016/0194544 A1 | 7/2016 | Jones et al. |
| 2016/0194548 A1 | 7/2016 | Xie et al. |
| 2016/0208157 A1 | 7/2016 | Vo et al. |
| 2016/0272875 A1 | 9/2016 | Ghumare et al. |
| 2016/0362599 A1 | 12/2016 | Wadekar et al. |
| 2017/0009122 A1 | 1/2017 | Funkhouser et al. |
| 2017/0130554 A1 | 5/2017 | Jones et al. |
| 2017/0137562 A1 | 5/2017 | Zheng et al. |
| 2017/0218247 A1* | 8/2017 | Sonnenschein ......... C04B 28/02 |
| 2017/0247598 A1* | 8/2017 | Kennedy ................ E21B 33/14 |
| 2017/0247607 A1 | 8/2017 | Hundt |
| 2017/0349804 A1 | 12/2017 | Kellum et al. |
| 2017/0350212 A1 | 12/2017 | Sabins et al. |
| 2018/0066489 A1 | 3/2018 | Pipchuk et al. |
| 2018/0216437 A1 | 8/2018 | Shafer |
| 2018/0346801 A1 | 12/2018 | Dandawate et al. |
| 2019/0249067 A1 | 8/2019 | Wagle et al. |
| 2020/0024503 A1 | 1/2020 | Watters et al. |
| 2021/0040376 A1* | 2/2021 | Devarapalli ........... C09K 8/502 |

FOREIGN PATENT DOCUMENTS

| | | |
|---|---|---|
| EP | 898049 A1 | 2/1999 |
| EP | 898050 A1 | 2/1999 |
| EP | 899415 A1 | 3/1999 |
| EP | 899416 A1 | 3/1999 |
| EP | 903461 A2 | 3/1999 |
| EP | 1031544 A2 | 8/2000 |
| EP | 2166028 A1 | 3/2010 |
| WO | 2014036218 A1 | 3/2014 |
| WO | 2014074112 A1 | 5/2014 |
| WO | 2014197827 A1 | 12/2014 |
| WO | 2014200889 A1 | 12/2014 |
| WO | 2015023186 A1 | 2/2015 |
| WO | 2015040241 A1 | 3/2015 |
| WO | 2016043979 A1 | 3/2016 |
| WO | 2016048303 A1 | 3/2016 |
| WO | 2016048332 A1 | 3/2016 |
| WO | 2016080974 A1 | 5/2016 |
| WO | 2016093827 A1 | 6/2016 |
| WO | 2016111674 A1 | 7/2016 |
| WO | 2017204812 A1 | 11/2017 |
| WO | 2019091900 A1 | 5/2019 |

OTHER PUBLICATIONS

International Search Report and Written Opinion dated Dec. 11, 2020 pertaining to International application No. PCT/US2020/050616 filed Sep. 14, 2020, 13 pgs.

Notice of Allowance and Fee(s) Due dated Dec. 30, 2020 pertaining to U.S. Appl. No. 16/809,822, filed Mar. 5, 2020, 13 pgs.

Bhaisora et al., "Innovative Application of Ultra-Lightweight Epoxy Resin-Cement Slurry Mixture Achieved Zonal Isolation Objectives and Secured Well Integrity: Case History From Offshore Gulf of Suez", IPTC-18504-MS, 2015.

Foianini et al., "Successful Identification and Bond Assessment of Epoxy-Based Resin Cement Behind Production Dasing: Integrating Cementing Technology with New Log Interpretation Methodology To Provide an Innovative Well Integrity Solution", SPWLA 55th Annual Logging Symposium, May 18-22, 2014.

Moe et al., "Anular pressure buildup: What it is and what to do about it", World Oil Deepwater Technology Supplement, Issue, p. 21-23, Aug. 2000.

Morris et al., "Resin-Based Cement Alternatives for Deepwater Well Construction", Society of Petroleum Engineers, SPE-155613-MS, 2012.

Nelson et al., "Well Cementing Fundamentals", Oilfield Review Summer, vol. 24, No. 2, pp. 59-60, 2012.

International Search Report and Written Opinion dated Mar. 15, 2019 pertaining to International application No. PCT/US2018/060282 filed Nov. 12, 2018, 13 pgs.

International Search Report and Written Opinion dated Jun. 21, 2019 pertaining to International application No. PCT/US2019/026882 filed Apr. 11, 2019, 14 pgs.

Office Action dated Sep. 17, 2019 pertaining to U.S. Appl. No. 16/117,902, filed Aug. 30, 2018, 26 pgs.

Office Action dated Sep. 30, 2019 pertaining to U.S. Appl. No. 16/117,974, filed Aug. 30, 2018, 35 pgs.

Office Action dated Nov. 13, 2019 pertaining to U.S. Appl. No. 16/515,673, filed Jul. 18, 2019, 23 pgs.

Office Action dated Nov. 18, 2019 pertaining to U.S. Appl. No. 16/117,950, filed Aug. 30, 2018, 22 pgs.

Cestari, A. R. et al., "Synthesis, characterization and hydration analysis of a novel epoxy/superplasticizer oilwell cement slurry Some mechanistic features by solution microcalorimetry" Journal of Colloid and Interface Science, Apr. 27, 2012, pp. 359-368, vol. 392.

Elyas, O. et al. "Use of Polymer Resins for Surface Annulus Isolation Enhancement" SPE-192266-MS, Society of Petroleum Engineers, Apr. 26, 2018, pp. 1-8.

Al-Yami, A. et al. "Optimum Practices to Mitigate Gas Migration Problems in Deep Gas Wells" SPE-187700-MS, Society of Petroleum Engineers, Oct. 18, 2017, pp. 1-21.

Alsaihati, Z. A. et al. "An Overview of Polymer Resin Systems Deployed for Remedial Operations in Saudi Arabia" SPE-188122-MS, Society of Petroleum Engineers, Apr. 27, 2017, pp. 1-15.

International Search Report and Written Opinion dated Nov. 7, 2019 pertaining to International application No. PCT/US2019/047846 filed Aug. 23, 2019.

(56) References Cited

OTHER PUBLICATIONS

International Search Report and Written Opinion dated Nov. 7, 2019 pertaining to International application No. PCT/US2019/047842 filed Aug. 23, 2019.
Final Rejection pertaining to U.S. Appl. No. 16/117,902 dated Jan. 17, 2020.
Office Action dated Mar. 10, 2020 pertaining to U.S. Appl. No. 16/117,974, filed Aug. 30, 2018, 39 pgs.
Notice of Allowance and Fee(s) Due dated Mar. 12, 2020 pertaining to U.S. Appl. No. 16/117,950, filed Aug. 30, 2018, 16 pgs.
Office Action dated Jan. 27, 2021 pertaining to U.S. Appl. No. 16/826,989, filed Mar. 23, 2020, 58 pgs.
Office Action dated Jan. 28, 2021 pertaining to U.S. Appl. No. 16/829,470, filed Mar. 25, 2020, 51 pgs.
Office Action dated May 7, 2021 pertaining to U.S. Appl. No. 16/117,902, filed Aug. 30, 2018, 76 pages.
Office Action dated May 25, 2021 pertaining to U.S. Appl. No. 16/829,470, filed Mar. 25, 2020, 25 pages.
Office Action dated May 21, 2021 pertaining to U.S. Appl. No. 16/826,989, filed Mar. 23, 2020, 25 pages.
Office Action dated Jun. 24, 2020 pertaining to U.S. Appl. No. 16/117,974, filed Aug. 30, 2018, 41 pgs.
Office Action dated Mar. 11, 2021 pertaining to U.S. Appl. No. 16/117,974, filed Aug. 30, 2018, 43 pgs.
Office Action dated May 8, 2020 pertaining to U.S. Appl. No. 16/515,673, filed Jul. 18, 2019, 41 pgs.
Office Action dated Nov. 17, 2020 pertaining to U.S. Appl. No. 16/117,974, filed Aug. 30, 2018, 46 pgs.
International Search Report and Written Opinion dated Jul. 23, 2020 pertaining to International application No. PCT/US2020/028050 filed Apr. 14, 2020, 15 pgs.
International Search Report and Written Opinion dated Jul. 23, 2020 pertaining to International application No. PCT/US2020/028082 filed Apr. 14, 2020, 15 pgs.
Office Action dated Oct. 6, 2020 pertaining to U.S. Appl. No. 16/809,892, filed Mar. 5, 2020, 44 pgs.
Office Action dated Oct. 6, 2020 pertaining to U.S. Appl. No. 16/809,822, filed Mar. 5, 2020, 44 pgs.
International Search Report and Written Opinion dated Jun. 1, 2021 pertaining to International application No. PCT/US2021/018660 filed Feb. 19, 2021, 14 pages.
U.S. Office Action dated Sep. 7, 2021 pertaining to U.S. Appl. No. 16/117,902, filed Aug. 30, 2018, 29 pages.
U.S. Office Action dated Nov. 3, 2021 pertaining to U.S. Appl. No. 16/906,607, filed Jun. 19, 2020, 92 pages.
U.S. Office Action dated Oct. 12, 2021 pertaining to U.S. Appl. No. 16/718,716, filed Dec. 18, 2019, 21 pages.
U.S. Office Action dated Oct. 13, 2021 pertaining to U.S. Appl. No. 16/515,673, filed Jul. 18, 2019, 64 pages.
U.S. Notice of Allowance and Fee(s) Due dated Feb. 7, 2022 pertaining to U.S. Appl. No. 16/718,716, filed Dec. 18, 2019, 13 pages.
U.S. Notice of Allowance and Fee(s) Due dated Feb. 9, 2022 pertaining to U.S. Appl. No. 16/117,902, filed Aug. 30, 2018, 15 pages.
U.S. Office Action dated Feb. 14, 2022 pertaining to U.S. Appl. No. 16/515,673, filed Jul. 18, 2019, 22 pages.
U.S. Notice of Allowance and Fee(s) Due dated Mar. 4, 2022 pertaining to U.S. Appl. No. 16/906,607, filed Jun. 19, 2020, 9 pages.

* cited by examiner

EPOXY-BASED LCM COMPOSITIONS WITH CONTROLLED VISCOSITY AND METHODS OF TREATING A LOST CIRCULATION ZONE OF A WELLBORE

TECHNICAL FIELD

Embodiments of the present disclosure generally relate to natural resource well drilling and, more specifically, to compositions and methods for treating a lost circulation zone of a wellbore.

BACKGROUND

Extracting hydrocarbons from subterranean sources may require drilling a hole from the surface to the subterranean geological formation containing the hydrocarbons. Specialized drilling techniques and materials are utilized to form the wellbore hole and extract the hydrocarbons. Specialized materials utilized in drilling operations include drilling fluids and materials for sealing the casing-casing annulus of the wellbore, which may be formulated for specific downhole conditions. A wellbore is a hole that extends from the surface to a location below the surface to permit access to hydrocarbon-bearing subterranean formations. The wellbore can contain at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore. The fluid conduit may be defined by one or more tubular strings, such as casings, inserted into the wellbore and secured in the wellbore.

During drilling of a wellbore, cementing the wellbore, or both, lost circulation zones may be encountered which result in loss of drilling fluids, cementing compositions, or other fluids. In a lost circulation zone, the drilling fluids, cement compositions, or other fluids flow out of the wellbore and into the surrounding formation. Lost circulation zones may increase the cost of the well through increased material costs to replace lost fluids and downtime to remediate the lost circulation zone. Lost circulation zones may be remediated by introducing a lost circulation material into the lost circulation zone to seal off the lost circulation zone to prevent further fluid loss.

SUMMARY

An ongoing need exists for lost circulation materials for treating lost circulation zones, such as high-injectivity lost circulation zones, encountered during resource well drilling. Cement compositions, such as reduced-cure-time cements, have been used to treat lost circulation zones, such as high-injectivity lost circulation zones, to seal off the lost circulation zone from the wellbore. However, during subsequent continued drilling of the wellbore and hydrocarbon production using the well, conventional cement compositions injected and cured to isolate lost circulation zones may be subjected to ongoing temperature and pressure cycling. This temperature and pressure cycling may cause microcracks to form in the cured cements. Fluids, such as gas or liquids, may migrate through these micro-cracks, eventually resulting in additional loss of fluids to the lost circulation zone.

Epoxy resin based materials for treating lost circulation zones have been developed as a solution to reduce the cracking in lost circulation zone treatments caused by continued temperature and pressure cycling. The epoxy resin based materials, once cured, may be more resistant to formation of micro-cracks caused by thermal and pressure cycling of the wellbore compared to conventional cements. However, for high-injectivity zones having greater porosity and greater fluid loss rates, the lesser viscosity of the epoxy resin based materials, compared to conventional cements, may not be sufficient to plug the pores or openings in the formation long enough to allow the epoxy resins to crosslink and cure into a solid or semi-solid barrier. The epoxy resins will eventually buildup on the walls of the pores over time. However, by the time the curing builds up enough cured epoxy in the pores, a significant amount of the epoxy resin based material may be lost to the formation.

Thus, ongoing needs exist for lost circulation material (LCM) compositions that provide resistance to formation of micro-cracks caused by temperature and pressure cycling as well as providing initial plugging of the pores to prevent loss of the LCM compositions to the formation before a suitable barrier is formed. These needs are met by embodiments of the LCM compositions of the present disclosure. The LCM compositions of the present disclosure may include an epoxy resin system, an amide accelerator having at least one amide functional group, and calcium carbonate having an average particle size of from 1,000 microns to 10,000 microns. The epoxy resin system may include at least one epoxy resin and at least one curing agent. The calcium carbonate may be calcium carbonate flake and may have an average particle size of greater than 1,000 microns. The calcium carbonate may provide initial plugging of the pores of the formation to prevent excessive loss of the epoxy resin system to the lost circulation zone before the epoxy resin system can cure to form a solid or semi-solid matrix. Thus, the LCM compositions of the present disclosure may be suitable for treating high-injectivity lost circulation zones while reducing further fluid loss compared to existing epoxy resin based material formulations. The presence of the amide accelerator may enable the LCM compositions to have controllable viscosity and cure time so that the LCM compositions can include a sufficient amount of calcium carbonate to initially plug the pores and still be injected into the lost circulation zone. The amide accelerator may additionally provide a decreased cure time, such as a cure time of less than 48 hours, less than 24 hours, less than 12 hours, or even less than 8 hours to treat a high-injectivity lost circulation zone. Thus, the LCM compositions of the present disclosure may have a reduced cure time while still having an initial dynamic viscosity sufficient to enable the LCM composition to be injected into the formation.

Once cured, the LCM compositions that include the epoxy resin system may form a barrier to prevent drilling fluids at a pressure greater than the formation pressure from flowing out of the wellbore and into the formation. The LCM compositions may exhibit greater compressive strength, reduced density, and greater elasticity compared to conventional cement compositions, which may enable the LCM compositions to resist degradation, such as formation of micro-cracks, caused by temperature and pressure cycling during production. As a result, the LCM composition may reduce or prevent penetration of drilling fluids into the formation. The LCM compositions may be more resistant to corrosive fluids than conventional cements and other materials used for lost circulation zone remediation. The LCM compositions that include the epoxy resin system can withstand greater pressures than conventional cements and may improve the zonal isolation and mitigate gas migration through the LCM composition compared to the conventional cements. For example, the LCM compositions that include the epoxy resin system can withstand pressures in a range of from 7,000 pounds per square inch (psi) (48,263 kilopascals (kPa)) to 15,000 psi (103,421 kPa) that are greater than conventional cement compositions, which can only withstand pressures in a range of from 500 psi (3447 kPa) to 5,000 psi (34,473 kPa). This ability of the LCM compositions with the epoxy resin system to withstand greater pressures may enable the LCM compositions to be injected a further distance into high-pressure formations compared to conventional cement compositions.

According to one or more aspects of the present disclosure, a lost circulation material (LCM) composition for sealing lost circulation zones in wellbores may include an epoxy resin comprising at least one of 2,3-epoxypropyl-o-tolyl ether, C12-C14 alkyl glycidyl ether, 1,6-hexanediol diglycidyl ether, butyl glycidyl ether, or cyclohexanedimethanol diglycidyl ether. The LCM composition may further include a curing agent, an amide accelerator, and calcium carbonate having an average particle size of from 1,000 microns to 10,000 microns. In embodiments, the epoxy resin may further include bisphenol-A-epichlorohydrin epoxy resin.

According to other aspects of the present disclosure, a method of treating a lost circulation zone of a wellbore may include injecting a lost circulation material (LCM) composition into the lost circulation zone. The LCM composition may include an epoxy resin comprising at least one of 2,3-epoxypropyl-o-tolyl ether, C12-C14 alkyl glycidyl ether, 1,6-hexanediol diglycidyl ether, butyl glycidyl ether, cyclohexanedimethanol diglycidyl ether. The LCM composition may further include a curing agent, an amide accelerator, and calcium carbonate having an average particle size of from 1,000 microns to 10,000 microns. The method may further include curing the LCM composition in the lost circulation zone to produce a barrier operable to prevent wellbore fluids from passing into the lost circulation zone.

Additional features and advantages of the described embodiments will be set forth in the detailed description, which follows, and in part will be readily apparent to those skilled in the art from that description or recognized by practicing the described embodiments, including the detailed description, which follows, as well as the claims.

DETAILED DESCRIPTION

Embodiments of the present disclosure are directed to lost circulation material (LCM) compositions having controlled viscosity and cure time and methods of treating lost circulation zones using the LCM compositions. The LCM compositions of the present disclosure for treating lost circulation zones in wellbores may include an epoxy resin, a curing agent operable to cure the epoxy resin, an amide accelerator, and calcium carbonate having an average particle size of from 1,000 micron (micrometers (μm)) to 10,000 microns. The epoxy resin may include at least one of 2,3-epoxypropyl-o-tolyl ether, C12-C14 alkyl glycidyl ether, 1,6-hexanediol diglycidyl ether, butyl glycidyl ether, cyclohexanedimethanol diglycidyl ether, or combinations of these. The LCM compositions of the present disclosure may have controlled viscosity and may be capable of treating high-injectivity lost circulation zones to reduce fluid loss to the high-injectivity lost circulation zones. A method of treating a lost circulation zone in a wellbore may include injecting an LCM composition according to the present disclosure and curing the LCM composition in the lost circulation zone to produce a barrier operable to prevent wellbore fluids from passing into the lost circulation zone.

As used throughout this disclosure, the term "hydrocarbon-bearing formation" refers to a subterranean geologic region containing hydrocarbons, such as crude oil, hydrocarbon gases, or both, which may be extracted from the subterranean geologic region.

As used throughout this disclosure, the term "fluid" may include liquids, gases, or both. As used throughout the disclosure, "spacer fluid" may refer to a fluid utilized to space apart any two other materials utilized in well production.

As used throughout this disclosure, the terms "uphole" and "downhole" may refer to a position within a wellbore relative to the surface, with "uphole" indicating direction or position closer to the surface and "downhole" referring to direction or position farther away from the surface.

As used throughout this disclosure, the term "high-injectivity zone" may refer to a lost circulation zone having an injectivity factor of less than or equal to 4000 pounds of force per square inch*min per barrel (psi*min/bbl) (or even less than or equal to 3000 psi*min/bbl), a fluid loss rate of greater than 100 barrels per hour, or both. As used in this disclosure, the term "barrel" refers to a unit of measure equal to 42 United States (U.S.) Gallons, which is equal to 0.159 cubic meters (where 1 U.S. gallon is equal to 0.003785 cubic meters). The injectivity factor is defined as the quotient of the injection pressure in pounds of force per square inch (psi) divided by the injection rate in barrels per minute (bbl/min). The fluid loss rate is the volume of fluid lost to the lost circulation zone per hour.

As used throughout this disclosure, the term "cure" or "curing," when used in the context of the epoxy resin systems, may refer to the process of cross-linking the epoxy resin, which is in a liquid form initially, with a curing agent to form a semi-solid or solid cured epoxy.

As used throughout this disclosure, the term "cure time," when used in the context of the epoxy resin system, may refer to a time duration between a first time at which a curing agent is added to the epoxy resins and a second time at which the epoxy resin system has cured to form at least a semi-solid epoxy.

As used throughout this disclosure, the term "substantial curing" refers to a degree of curing that produces a change of greater than 5 percent (%) in any rheological property of the LCM composition.

As used in this disclosure, the term "semi-solid" may refer to a state of the LCM compositions that is between a liquid and a solid and in which the LCM compositions exhibit greater elasticity and flexibility compared to compositions cured all the way to a rigid solid. In the semi-solid state, the LCM compositions may be easily deformed but may return to shape upon releasing the deforming force.

The wellbore forms a pathway capable of permitting both fluids and apparatus to traverse between the surface and the hydrocarbon-bearing formation. Besides defining the void volume of the wellbore, the wellbore wall also acts as the interface through which fluid can transition between the subterranean formation and the interior of the well bore. The wellbore wall can be unlined (that is, bare rock or formation) to permit such interaction with the formation or lined, such as by a tubular string, so as to prevent such interactions.

The wellbore may include at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore. Example equipment connected at the surface to the fluid conduit includes pipelines, tanks, pumps, compressors, and flares. The fluid conduit may be large enough to permit introduction and removal of mechanical devices, including but not limited to tools, drill strings, sensors, and instruments, into and out of the interior of the well bore.

The wellbore may be drilled using a drill string in the presence of a drilling fluid. While drilling the wellbore, the drilling operation may encounter a lost circulation zone. When a lost circulation zone is encountered during drilling, fluids in the wellbore flow from the wellbore into the subterranean formation, resulting in loss of these fluids. These fluids can include but are not limited to drilling fluids, sealing compositions, spacer fluids, wash fluids, pre-flush fluids, or displacement fluids. In some instances, lost circulation may be caused by the natural state of the subterranean formation through which the drilling passes. For example, the subterranean formation may be naturally fractured or may be an unconsolidated formation, such as but not limited to gravel, sand, pea, or combinations of these. The subterranean formation may also include caves, caverns, tunnels, or other voids in the formation capable of receiving fluids from the wellbore. Alternatively, in other circumstances, the hydrostatic pressure of the fluids in the wellbore may be greater than the fracture gradient of the subterranean formation, which may cause at least some breakdown of the pores in the formation. If the pores in the formation breakdown, then the pores may become large enough to reduce the resistance to flow of fluids into and through the pores, which may result in the formation receiving fluids from the wellbore instead of resisting the flow of these fluids into the formation.

As previously described in this disclosure, high-injectivity zones may be characterized by having an injectivity factor of less than or equal to 4000 psi*min/bbl, or even less than or equal to 3000 psi*min/bbl, or having a fluid loss rate of greater than 100 barrels per hour (bbl/hr), such as a fluid loss rate of from 100 bbl/hr to 1000 bbl/hr. In other words, high-injectivity lost circulation zones may have less resistance to flow of fluids into the formation compared to low-injectivity lost circulation zones. When a high-injectivity lost circulation zone is encountered, pumping fluids downhole may result in no fluids returned back to the surface. High-injectivity lost circulation zones may have greater porosity, such as greater pore size, greater size of micro-cracks, or greater pore density compared to low-injectivity zones. High-injectivity lost circulation zone may also include subterranean caves or other void spaces in the formation that can receive fluids from the wellbore. The greater porosity of the high-injectivity lost circulation zones may reduce the resistance to flow into the formation. In some embodiments, high-injectivity lost circulation zones may have an average microcrack width of greater than 100 microns.

As previously discussed, embodiments of the present disclosure are directed to LCM compositions having controlled viscosity and cure time and methods of remediating lost circulation zones using the LCM compositions. The LCM compositions of the present disclosure for sealing lost circulation zones in wellbores may include an epoxy resin, a curing agent operable to cure the epoxy resin, an amide accelerator that includes at least one amide functional group, and calcium carbonate particles having an average particle size of from 1,000 microns to 10,000 microns.

The LCM compositions of the present disclosure may be suitable for treating high-injectivity lost circulation zones. As previously discussed, the calcium carbonate particles may include calcium carbonate flakes having an average particle size of from 1,000 microns to 10,000 microns. When injected into the lost circulation zone, the calcium carbonate flakes may deposit within the pores, such as on the pore walls, and buildup viscosity in the pores to form temporary initial barriers to flow. These initial barriers to flow formed by the calcium carbonate flakes may maintain the epoxy resin system and amide accelerator of the LCM compositions in the portion of the lost circulation zone intended to be treated. This may prevent loss of the epoxy resin system and amide accelerator to the formation before the epoxy resin system can cure and cross-link to form a semi-solid or solid matrix. The presence of the calcium carbonate flakes may increase the viscosity of the LCM compositions. The amide accelerator may enable the LCM compositions to have controllable viscosity and cure time so that the LCM compositions can be injected into the lost circulation zone and still have a sufficiently short cure time, such as a cure time of less than 48 hours, less than 24 hours, less than 12 hours, or even less than or equal to 8 hours, to treat a high-injectivity lost circulation zone without being lost to the formation. Thus, the LCM compositions of the present disclosure may have a reduced cure time while still having an initial dynamic viscosity that enables the LCM composition comprising the calcium carbonate particles to be injected into the lost circulation zone. The dynamic viscosity of the LCM composition may be also referred to as the absolute viscosity and may be a measurement of the resistance to flow of the LCM compositions. The initial dynamic viscosity may be the dynamic viscosity of the LCM composition before any substantial curing has taken place.

Additionally, the LCM compositions comprising the epoxy resin systems may be more resistant to formation of micro-cracks caused by thermal and pressure cycling of the wellbore compared to conventional cements. Once cured, the LCM compositions that include the epoxy resin system may form a barrier to prevent drilling fluids at a pressure greater than the formation pressure from flowing out of the wellbore and into the formation. The LCM compositions may exhibit greater compressive strength, reduced density, and greater elasticity compared to conventional cement compositions, which may enable the LCM compositions to resist degradation, such as formation of micro-cracks, caused by temperature and pressure cycling during production. As a result, the LCM composition may reduce or prevent penetration of drilling fluids into the formation. The LCM compositions may be more resistive to corrosive fluids than conventional cements and other materials used for lost circulation zone remediation. The LCM compositions that include the epoxy resin system can withstand greater pressures than conventional cements and may improve the zonal isolation and mitigate gas migration through the LCM composition compared to the conventional cements. For example, the LCM compositions that include the epoxy resin system can withstand pressures in a range of from 7,000 pounds per square inch (psi) (48,263 kilopascals (kPa)) to 15,000 psi (103,421 kPa) that are greater than conventional cement compositions, which can only withstand pressures in a range of from 500 psi (3447 kPa) to 5,000 psi (34,473 kPa). This ability of the LCM compositions with the epoxy resin system to withstand greater pressures may enable the LCM compositions to be injected deeper into high-pressure formations compared to conventional cement compositions.

As previously discussed in this disclosure, LCM compositions of the present disclosure may include an epoxy resin system that includes at least one epoxy resin and at least one curing agent. As used in this disclosure, the term "epoxy resin system" may refer to the constituents that react to form the cured epoxy and may include but are not limited to the epoxy resins, reactive and non-reactive diluents, and curing agents. The "epoxy resin system" may generally exclude weighting materials, emulsifiers, the calcium carbonate, and components and additives that do not participate in the polymerization reaction of the epoxy system. In the present disclosure, the amide accelerators are treated as separate constituents of the LCM compositions but may be considered part of the epoxy resin system in one or more embodiments.

The epoxy resin may include bisphenol-A-based epoxy resins, bisphenol-F-based epoxy resins, aliphatic epoxy resins, aromatic epoxy resins, Novalac resins, or combinations of these epoxy resins. Aliphatic and aromatic epoxy resins may include glycidyl ethers and diglycidyl ethers. Glycidyl ethers may include alkyl glycidyl ethers, aromatic glycidyl ethers, or both. Glycidyl ethers may have chemical formula (I):

$$R^1\text{—O—}CH_2\text{—}(C_2H_3O) \quad (I)$$

where $R^1$ may be a linear, branched, cyclic, or aromatic hydrocarbyl having from 4 to 24 carbon atoms, such as from 4 to 20, from 4 to 16, from 4 to 12, from 4 to 8, from 6 to 24, from 6 to 20, from 6 to 16, from 6 to 12, or from 12 to 14 carbon atoms. In some embodiments, $R^1$ may be a branched, linear, or cyclic alkyl. In some embodiments, $R^1$ may include one or more substituted or unsubstituted aromatic rings. In some embodiments, the epoxy resin may include C12-C14 alkyl glycidyl ethers, butyl glycidyl ether, 2,3-epoxypropyl-o-tolyl ether, or combinations of these. Diglycidyl ethers may have chemical formula (II):

$$(OC_2H_3)\text{—}CH_2\text{—O—}R^2\text{—O—}CH_2\text{—}(C_2H_3O) \quad (II)$$

where $R^2$ may be a linear, branched, cyclic, or aromatic hydrocarbyl having from 4 to 24 carbon atoms, such as from 4 to 20, from 4 to 16, from 4 to 12, from 4 to 8, from 6 to 24, from 6 to 20, from 6 to 16, from 6 to 12, or from 12 to 14 carbon atoms. In some embodiments, $R^2$ may include one or more substituted or unsubstituted aromatic rings. In some embodiments, $R^2$ may be an alkyl group or cycloaklyl group. For example, in some embodiments, the epoxy resin may include 1,6-hexanediol diglycidyl ether, which has chemical formula (III):

$$(OC_2H_3)\text{—}CH_2\text{—O—}C_6H_{12}\text{—O—}CH_2\text{—}(C_2H_3O) \quad (III)$$

In some embodiments, the epoxy resin may include cyclohexanedimethanol diglycidyl ether, which has chemical formula (IV):

$$(OC_2H_3)\text{—}CH_2\text{—O—}CH_2\text{—}(C_6H_{10})\text{—}CH_2\text{—O—}CH_2\text{—}(C_2H_3O) \quad (IV)$$

The epoxy resin in the LCM compositions may include at least one of a bisphenol-A-epichlorohydrin epoxy resin, an alkyl glycidyl ether, an alkyl diglycidyl ether, an aromatic glycidyl ether, or combinations of these. The epoxy resin in the LCM composition may include at least one of 1,6-hexanediol diclycidyl ether, alkyl glycidyl ethers having from 12 to 14 carbon atoms, butyl glycidyl ether, 2,3-epoxypropyl o-tolyl ether, cyclohexanedimethanol diclycidyl ether, bisphenol-A-epichlorohydrin epoxy resin, or combinations of these. In one or more embodiments, the epoxy resin of the LCM composition may include at least one of 1,6-hexanediol diclycidyl ether, alkyl glycidyl ethers having from 12 to 14 carbon atoms, 2,3-epoxypropyl o-tolyl ether, butyl glycidyl ether, cyclohexanedimethanol diglycidyl ether, or combinations of these.

The epoxy resin may have an epoxy value of from 4.5 epoxy equivalents per kilogram of the epoxy resin to 5.5 epoxy equivalents per kilogram of the epoxy resin. The epoxy equivalent weight of an epoxy resin is the weight of the epoxy resin in grams that contains one equivalent weight of epoxy. The epoxy equivalent weight of the epoxy resin is equal to the molecular weight of the epoxy resin divided by the average number of epoxy groups in the epoxy resin. The epoxy resins may have an epoxy equivalent weight of from 170 to 350 grams of resin per epoxy equivalent (g/eq). The epoxy value and epoxy equivalent weight of an epoxy resin may be determined according to ASTM-D1652. Other methods of determining the epoxy value and epoxy equivalent weight of the epoxy resin may also be used to determine the epoxy value or epoxy equivalent weight of the epoxy resin.

In some embodiments, the epoxy resin may be modified with a reactive diluent. The type and amount of reactive diluent may influence the viscosity, flexibility, hardness, chemical resistance, mechanical properties, plasticizing effect, reactivity, crosslinking density, or other properties of the epoxy resin. In some embodiments, the reactive diluent may be added to the epoxy resin to change the viscosity of the epoxy resin, such as to reduce the viscosity of the epoxy resin. In other embodiments, the reactive diluents may be added to improve at least one of the adhesion, the flexibility, and the solvent resistance of the epoxy resin. The reactive diluent can be a non-functional, mono-functional, di-functional, or multi-functional reactive diluent. For example, a non-functional reactive diluent does not have an epoxide functional group. As used in relation to reactive diluents, the term "functional" refers to the reactive diluent having at least one epoxide functional group. A functional reactive diluent may have one, two, three, or more than three epoxide functional groups. The term "non-functional", as used in relation to reactive diluents, refers to a reactive diluent that does not have at least one epoxide functional group. Thus, a non-functional reactive diluent does not have at least one epoxide functional group, but may still participate in at least one chemical reaction during cross-linking of the epoxide resin. The term "non-reactive diluent" may refer to a diluent that does not participate in a chemical reaction during cross-linking of the epoxy resin. Examples of reactive and non-reactive diluents may include, but are not limited to, propylene glycol diglycidyl ether, butanediol diglycidyl ether, cardanol glycidyl ether derivatives, propanetriol triglycidyl ether, aliphatic monoglycidyl ethers of $C_{13}$-$C_{15}$ alcohols, or combinations of functional or non-functional reactive diluents and non-reactive diluents. In some embodiments, the epoxy resin may include a reactive diluent having the formula (V):

$$R^3\text{—O—}CH_2\text{—}(C_2H_3O) \quad (V)$$

where $R^3$ may be a linear or branched hydrocarbyl having from 12 to 14 carbon atoms. $R^3$ may be linear, branched, or cyclic. In some embodiments, $R^3$ may be an alkyl group.

The epoxy resin in the LCM composition may include an amount of reactive diluent that modifies one or more of the viscosity, adhesion, the flexibility, or the solvent resistance of the epoxy resin. In some embodiments, the epoxy resin may include from 1 wt. % to 30 wt. % reactive diluent based on the total weight of the epoxy resin portion of the epoxy resin system. As used in this disclosure, the term "epoxy resin portion" refers to the constituents of the epoxy resin system that do not include the curing agents, accelerators, retarders, and additives of the epoxy resin system. The epoxy resin portion includes the epoxy resins and any added reactive or non-reactive diluent. In some embodiments, the epoxy resin may include from 1 wt. % to 20 wt. %, from 1 wt. % to 16 wt. %, from 1 wt. % to 14 wt. %, from 1 wt. % to 12 wt. %, from 5 wt. % to 30 wt. %, from 5 wt. % to 20 wt. %, from 5 wt. % to 16 wt. %, from 5 wt. % to 14 wt. %, from 5 wt. % to 12 wt. %, from 10 wt. % to 30 wt. %, from 10 wt. % to 20 wt. %, from 10 wt. % to 16 wt. %, from 10 wt. % to 14 wt. %, from 12 wt. % to 30 wt. %, from 12 wt. % to 20 wt. %, from 12 wt. % to 16 wt. %, from 14 wt. % to 30 wt. %, from 14 wt. % to 20 wt. %, or from 14 wt. % to 16 wt. % reactive diluent based on the total weight of the epoxy resin portion of the epoxy resin system.

In one or a plurality of embodiments, the epoxy resin may include bisphenol-A-(epichlorohydrin) epoxy resin with oxirane mono [($C_{12}$-$C_{14}$)-alkyloxy)methyl] derivatives. The bisphenol-A-epichlorohydrin epoxy resin may refer to an epoxy resin made by reaction of bisphenol-A and epichlorohydrin. The bisphenol-A-(epichlorohydrin) epoxy resin may then be modified with the reactive diluent oxirane mono [($C_{12}$-$C_{14}$)-alkyloxy) methyl] derivatives, which may reduce the viscosity of the resin and may improve the adhesion, flexibility, and solvent resistance of the final cured epoxy. The bisphenol-A-(epichlorohydrin) epoxy resin with the reactive diluent oxirane mono [($C_{12}$-$C_{14}$)-alkyloxy) methyl] derivatives may modify the viscosity of LCM compositions, or may provide the LCM compositions with a non-crystalizing resin and improved mechanical and chemical resistance compared to compositions without the bisphenol-A-(epichlorohydrin) epoxy resin with the reactive diluent oxirane mono [($C_{12}$-$C_{14}$)-alkyloxy) methyl] derivatives. In some embodiments, the epoxy resin portion may include from 70 wt. % to 90 wt. %, from 70 wt. % to 88 wt. %, from 70 wt. % to 86 wt. %, from 70 wt. % to 84 wt. %, from 80 wt. % to 90 wt. %, from 80 wt. % to 88 wt. %, from 80 wt. % to 86 wt. %, from 80 wt. % to 84 wt. %, from 84 wt. % to 90 wt. %, from 84 wt. % to 88 wt. %, or from 84 wt. % to 86 wt. % of the bisphenyl-A-epichlorohydrin epoxy resin based on the total weight of the epoxy resin portion of the epoxy resin system. In some embodiments, the epoxy resin may include from 10 wt. % to 30 wt. %, from 10 wt. % to 20 wt. %, from 10 wt. % to 16 wt. %, from 10 wt. % to 14 wt. %, from 12 wt. % to 30 wt. %, from 12 wt. % to 20 wt. %, from 12 wt. % to 16 wt. %, from 12 wt. % to 14 wt. %, from 14 wt. % to 30 wt. %, from 14 wt. % to 20 wt. %, or from 14 wt. % to 16 wt. % oxirane mono[($C_{12}$-$C_{14}$)-alkyloxy)methyl] derivatives based on the total weight of the epoxy resin portion of the epoxy resin system.

In some embodiments, the epoxy resin comprising the bisphenol-A-(epichlorohydrin) epoxy resin with the reactive diluent oxirane mono [($C_{12}$-$C_{14}$)-alkyloxy) methyl] derivatives may have an epoxy value of from 4.76 epoxy equivalents per kilogram of epoxy resin to 5.26 epoxy equivalents per kilogram of epoxy resin. The epoxy resin comprising the bisphenol-A-(epichlorohydrin) epoxy resin with the reactive diluent oxirane mono [($C_{12}$-$C_{14}$)-alkyloxy) methyl] derivatives may have an epoxy equivalent weight of 190 g/eq to 210 g/eq and a dynamic viscosity of from 600 millipascal seconds (mPa*s) to 1200 mPa*s, or 600 mPa*s to 900 mPa*s.

The epoxy resin may include 2,3-epoxypropyl-o-tolyl ether, which may have an epoxy equivalent weight of from 170 g/eq to 190 g/eq and exhibit a dynamic viscosity of from 7 mPa*s to 10 mPa*s. The epoxy resin may include alkyl glycidyl ethers having from 12 to 14 carbon atoms, which may have an epoxy equivalent weight of from 270 g/eq to 305 g/eq and may exhibit a dynamic viscosity of from 5 mPa*s to 12 mPa*s. The epoxy resin may include 1,6-hexanediol diclycidyl ether, which may have an epoxy equivalent weight of from 150 g/eq to 170 g/eq and may exhibit a dynamic viscosity of from 20 mPa*s to 30 mPa*s. The epoxy resin may include cyclohexanedimethanol diglycidyl ether, which may have an epoxy equivalent weight of from 125 g/eq to 145 g/eq and may exhibit a dynamic viscosity of from 50 mPa*s to 70 mPa*s. The epoxy resin may include butyl glycidyl ether, which may have an epoxy equivalent weight of from 120 g/eq to 140 g/eq and may exhibit a dynamic viscosity of from 400 mPa*s to 500 mPa*s.

The epoxy resin system of the LCM composition may include a plurality of epoxy resins. The epoxy resin system of the LCM composition may include a combination of two or more of bisphenol-A-based epoxy resins, bisphenol-F-based epoxy resins, aliphatic epoxy resins, aromatic epoxy resins, Novalac resins, or combinations of these epoxy resins. In one or more embodiments, the epoxy resin system in the LCM composition may include two or more of 1,6-hexanediol diclycidyl ether, alkyl glycidyl ethers having from 12 to 14 carbon atoms, butyl glycidyl ether, 2,3-epoxypropyl o-tolyl ether, cyclohexanedimethanol diclycidyl ether, bisphenol-A-epichlorohydrin epoxy resin, or combinations of these. In one or more embodiments, the epoxy resin system in the LCM composition may include bisphenol-A-epichlorohydrin epoxy resin and 2,3-epoxypropyl-o-tolyl ether. In one or more embodiments, the epoxy resin system in the LCM composition may include bisphenol-A-epichlorohydrin epoxy resin and butyl glycidyl ether. In some embodiments, the epoxy resin in the LCM composition may include bisphenol-A-epichlorohydrin epoxy resin, butyl glycidyl ether, and cyclohexanedimethanol diglycidyl ether.

The LCM compositions may include an amount of the epoxy resin sufficient to form a cured epoxy composition. For example, the LCM compositions may include from 15 wt. % to 75 wt. % epoxy resin based on the total weight of the LCM composition before curing. The LCM composition may include from 15 wt. % to 70 wt. %, from 15 wt. % to 65 wt. %, from 15 wt. % to 60 wt. %, from 30 wt. % to 75 wt. %, from 30 wt. % to 70 wt. %, from 30 wt. % to 65 wt. %, from 30 wt. % to 60 wt. %, from 40 wt. % to 75 wt. %, from 40 wt. % to 70 wt. %, from 40 wt. % to 65 wt. %, from 40 wt. % to 60 wt. %, from 50 wt. % to 75 wt. %, from 50 wt. % to 70 wt. %, from 50 wt. % to 65 wt. %, or from 55 wt. % to 65 wt. % epoxy resin based on the total weight of the LCM composition before curing. The weight percentages for the epoxy resin, curing agent, and amide accelerator are provided for the LCM composition formulation at the time of initially preparing the LCM composition prior to any cross-linking or curing, which may change the chemical make-up of one or more of these constituents.

As previously discussed in this disclosure, the epoxy resin system includes a curing agent to cure the epoxy resin. The curing agent may include at least one amine group. Curing agents with amine functional groups may include, but are not limited to, at least one of an amine, polyamine, amine adduct, polyamine adduct, alkanolamine, phenalkamines, or combinations of these. Amine or polyamine curing agents may include, but are not limited to, aliphatic amines, cycloaliphatic amines, modified cycloaliphatic amines such as cycloaliphatic amines modified by polyacrylic acid, aliphatic polyamines, cycloaliphatic polyamines, modified polyamines such as polyamines modified by polyacrylic acid, or amine adducts such as cycloaliphatic amine adducts or polyamine adducts.

In some embodiments, the curing agent may include at least one of trimethyl hexamethylene diamine (TMD), diethylenetriamine (DETA), triethylenetetramine (TETA), meta-xylenediamine (MXDA), aminoethylpiperazine (AEP), tetraethylenepentamine (TEPA), polyetheramine, isophoronediamine (IPDA), diethyltoluenediamine (DETDA), polyoxypropylene diamine, or combinations of these. In one or more embodiments, the curing agent may include at least one of DETA, DETDA, polyoxypropylene diamine, or combinations of these. The epoxy resin system in the LCM composition may include a plurality of curing agents.

The curing agent may be an amine curing agent having an amine value that enables the amine curing agent to fully cure the epoxy resin system. The amine value of a curing agent gives the active hydrogen (NH) content of an amine curing agent. The amine value is expressed as the weight in milligrams of potassium hydroxide (KOH) needed to neutralize the NH in 1 gram of the amine curing agent. In some embodiments, the curing agent may have an amine value of from 250 milligrams of KOH per gram (mg KOH/g) to 1700 mg KOH/g, from 250 mg KOH/g to 1650 mg KOH/g, from 250 mg KOH/g to 1600 mg KOH/g, from 450 mg KOH/g to 1700 mg KOH/g, from 450 mg KOH/g to 1650 mg KOH/g, from 450 mg KOH/g to 1600 mg KOH/g, from 650 mg KOH/g to 1700 mg KOH/g, from 650 mg KOH/g to 1650 mg KOH/g, or from 650 mg KOH/g to 1600 mg KOH/g. The amine value may be determined by titrating a solution of the curing agent with a dilute acid, such as a 1 N solution of hydrochloric acid (HCl). The amine value may then be calculated from the amount of HCl needed to neutralize the amine in the solution according to Equation 1 (EQU. 1):

$$\frac{V_{HCl} * N_{HCl} * MW_{KOH}}{W} \qquad \text{EQU. 1}$$

where $V_{HCl}$ is the volume in milliliters of HCl needed to neutralize the amine, $N_{HCl}$ is the normality of HCl used to titrate the amine, $MW_{KOH}$ is the molecular weight of KOH in grams per mole, and W is the weight in grams of the curing agent sample titrated. The amine number of the known pure amine curing agent may be calculated from Equation 2 (EQU. 2):

$$\frac{1000 * MW_{KOH}}{MW_{curing\ agent}} \qquad \text{EQU. 2}$$

where $MW_{KOH}$ is the molecular weight of KOH in grams per mole, and $MW_{curing\ agent}$ is the molecular weight of the curing agent in grams per mole.

The amine curing agent may have an amine hydrogen equivalent weight (AHEW) that enables the amine curing agent to fully cure the epoxy resin system. The AHEW of an amine curing agent refers to the grams of the amine curing agent containing 1 equivalent of amine. The AHEW of an amine curing agent may be calculated by dividing the molecular weight of the amine curing agent in grams per mole by the number of active hydrogens per molecule. In some embodiments, the curing agent may be an amine curing agent having an AHEW of from 20 grams (g) to 120 g, from 20 g to 115 g, from 20 g to 110 g, from 20 g to 100 g, from 40 g to 120 g, from 40 g to 115 g, from 40 g to 110 g, from 40 g to 110 g, from 60 g to 120 g, from 60 g to 115 g, or from 60 g to 110 g determined according to the methods previously described in this disclosure.

The epoxy resins in the epoxy resin system may be in liquid form initially. Upon combining the epoxy resins with the curing agents to form the epoxy resin system, the epoxy resins react with the curing agents to transform into a semi-solid or solid epoxy resin. Transition of the epoxy resin system from a liquid to a solid involves formation of covalent bonds via cross-linking reactions that initially build viscosity in the epoxy resin system. Thus, during the curing process in which the epoxy resin system transforms from liquid to solid through cross-linking, the buildup of viscosity in the LCM compositions may enable the LCM compositions to continue to transmit hydrostatic pressure to the hydrocarbon-bearing formation. At a crossover point in the curing process, the epoxy resin system may begin to form into a non-porous three-dimensional network. As this non-porous three-dimensional network begins to form, the epoxy resin system continues to transmit hydrostatic pressure to the formation until an impermeable barrier of cured epoxy polymer forms within the pores of the formation. This impermeable barrier formed by the cured epoxy polymer of the LCM composition may remediate the lost circulation zone by preventing the flow of liquids from the wellbore into the lost circulation zone.

The epoxy resin system may have a cure time that enables the LCM composition to be transferred into the lost circulation zone in the formation before the buildup of viscosity during curing causes transfer problems, such as inability to pump the LCM composition.

The curing time of the epoxy resin system may be inversely proportional to the amount of curing agent in the epoxy resin system. For example, increasing the amount of the curing agent in the epoxy resin system may decrease the curing time of the epoxy resin system. The epoxy resin system may include an amount of curing agent capable of curing the epoxy resin system to a semi-solid state in a cure time of less than or equal to 48 hours, less than or equal to 24 hours, less than or equal to 12 hours, or even less than or equal to 8 hours. As described previously in this disclosure, the term "semi-solid" refers to a state of the epoxy resin system that is between a liquid and a solid and in which the cured epoxy polymers exhibit greater elasticity and flexibility compared to an epoxy resin cured all the way to a rigid solid. In the semi-solid state, the LCM compositions containing the epoxy resin systems may be easily deformed but may return to shape upon releasing the deforming force. The LCM compositions that include the epoxy resin system cured to a semi-solid or solid state are capable of sealing a lost circulation zone, such as a high-injectivity lost circulation zone.

The LCM composition may include an amount of curing agent sufficient to cure the epoxy resins in the LCM composition to a semi-solid or solid state. The LCM compositions may include from 1 wt. % to 30 wt. % curing agent based on the total weight of the LCM composition before curing, such as within 30 minutes of adding the curing agent to the LCM composition. In one or more embodiments, the LCM composition may have from 1 wt. % to 25 wt. %, from 1 wt. % to 20 wt. %, from 1 wt. % to 15 wt. %, from 1 wt. % to 10 wt. %, from 2 wt. % to 30 wt. %, from 2 wt. % to 25 wt. %, from 2 wt. % to 20 wt. %, from 2 wt. % to 15 wt. %, or from 2 wt. % to 10 wt. % curing agent based on the total weight of the LCM composition before curing.

As previously discussed, the LCM composition includes calcium carbonate, which may provide initial plugging of the pores of a lost circulation zone while the epoxy resin system undergoes cross-linking to cure into a semi-solid or solid matrix. The calcium carbonate may be calcium carbonate flakes. In one or more embodiments, the calcium carbonate may have other shapes, such as but not limited to, spherical particles, fibers, cylindrical rods, or combinations of these. The calcium carbonate may have an average particle size of greater than or equal to 1,000 microns, greater than or equal to 2,000 microns, or even greater than or equal to 4,000 microns. If the average particle size of the calcium carbonate is less than 1,000 microns, the calcium carbonate may not have a size sufficient to build viscosity in the pores of a high-injectivity lost circulation zone, resulting in continued loss of the LCM composition to the lost circulation zone. The calcium carbonate may have an average particle size of less than or equal to 10,000 microns, less than or equal to 9,000 microns, or even less than or equal to 8,000 microns. If the calcium carbonate has an average particle size of greater than 10,000 microns, the calcium carbonate may cause the LCM compositions to be too viscous, which may prevent the LCM compositions from being injected into the lost circulation zone. The calcium carbonate may have an average particle size of from 1,000 microns to 10,000 microns, from 1,000 microns to 9,000 microns, from 1,000 microns to 8,000 microns, from 2,000 microns to 10,000 microns, from 2,000 microns to 9,000 microns, from 2,000 microns to 8,000 microns, from 4,000 microns to 10,000 microns, from 4,000 microns to 9,000 microns, from 4,000 microns to 8,000 microns. The average particle size of the calcium carbonate may be determined according to known methods, such as but not limited to laser diffraction or dynamic light scattering methods.

When the LCM composition is injected into the formation, the calcium carbonate having an average particle size of from 1,000 microns to 10,000 microns may buildup within the pores of the lost circulation zone to provide an initial barrier to flow of the LCM composition further into the lost circulation zone than intended. The greater size of the calcium carbonate flakes compared to finer grades of calcium carbonate may enable the calcium carbonate flakes to buildup and at least partially plug a broad range of pore sizes, in particular the greater pore sizes of high-injectivity zones. The calcium carbonate flakes having average particle size of from 1,000 microns to 10,000 microns may build up within the pores by depositing on the walls of the pores. The buildup of the calcium carbonate on the walls may gradually reduce the pore size in the lost circulation zone to reduce or prevent flow of the LCM composition deeper into the lost circulation zone, where the LCM composition could be lost to the formation. The reduced flow region or barrier formed by the calcium carbonate may enable the epoxy resins of the LCM composition to undergo cross-linking to cure into a semi-solid or solid matrix.

The LCM compositions may have an amount of calcium carbonate sufficient to build viscosity in the pores of the lost circulation zone to create an initial barrier to flow within the pores of the lost circulation zone. The LCM compositions may have greater than or equal to 20 wt. %, greater than or equal to 25 wt. %, greater than or equal to 30 wt. %, or even greater than or equal to 35 wt. % calcium carbonate based on the total weight of the LCM composition. The LCM compositions may have less than or equal to 80 wt. %, less than or equal to 70 wt. %, less than or equal to 60 wt. %, or even less than or equal to 50 wt. % calcium carbonate based on the total weight of the LCM composition. The LCM composition may include from 20 wt. % to 80 wt. %, from 20 wt. % to 70 wt. %, from 20 wt. % to 60 wt. %, from 20 wt. % to 50 wt. %, from 25 wt. % to 80 wt. %, from 25 wt. % to 70 wt. %, from 25 wt. % to 60 wt. %, from 25 wt. % to 50 wt. %, from 30 wt. % to 80 wt. %, from 30 wt. % to 70 wt. %, from 30 wt. % to 60 wt. %, or from 30 wt. % to 50 wt. % calcium carbonate based on the total weight of the LCM composition. The concentration of the calcium carbonate in the LCM composition may be increased or decreased depending on the characteristics of the lost circulation zone, such as but not limited to the porosity, fluid loss rate, injectivity factor, or combinations of these. As a non-limiting example, the concentration of calcium carbonate in the LCM composition may be increased for lost circulation zones having greater porosity or greater fluid loss rate and may be decreased for lost circulation zones having less porosity or lesser fluid loss rate.

As previously discussed, the epoxy resin system of the LCM compositions may include one or a plurality of amide accelerators having at least one amide functional group, which may modify the cure time of the LCM compositions. As previously discussed, incorporation of the calcium carbonate into the LCM compositions may increase the viscosity of the LCM compositions. To compensate for this effect, epoxy resins having lesser dynamic viscosities, such as but not limited to 1,6-hexanediol diclycidyl ether, alkyl glycidyl ethers having from 12 to 14 carbon atoms, butyl glycidyl ether, 2,3-epoxypropyl o-tolyl ether, cyclohexanedimethanol diclycidyl ether, may be incorporated into the LCM compositions to reduce the dynamic viscosity so that the LCM compositions can be injected into the formation. However, as discussed above, the reduced viscosity epoxy resins may have lesser epoxy equivalent weights compared to the other epoxy resins, such as but not limited to bisphenol-A-(epichlorohydrin) epoxy resins, and, thus, may have greater cure times to undergo cross-linking to form a semi-solid or solid. The amide accelerators may operate to increase the rate of cross-linking of the epoxy resin system to reduce the cure time of the LCM compositions. Thus, the reduced cure time provided by the amide accelerators may enable the LCM compositions to include combinations of epoxy resins and curing agents having lesser dynamic viscosities to enable the LCM compositions with the added calcium carbonate to be pumped and injected into the lost circulation zone. The amide accelerators may broaden the range of possible epoxy resin/curing agent combinations by enabling inclusion of combinations of epoxy resins and curing agents that have greater cure times by themselves without the amide accelerator.

The amide accelerators may include at least one amide functional group and, optionally, at least one amine functional group. The amide accelerator may include at least one of an amide, a polyamide, a tall oil fatty amide, a fatty polyamide, a carboxylic acid terminated fatty polyamide, an amidoamine, a fatty amidoamine, a polyamidoamine, a polyolefin amide alkene amine, or combinations of these, including salts of these compounds. In some embodiments, the amide accelerator may include at least one of a carboxylic acid terminated fatty polyamide, an amidoamine, a polyamidoamine, a polyaminated fatty acid, or combinations of these, including salts of these compounds.

In some embodiments, the amide accelerator may include an amidoamine having chemical formula (VI), which is provided subsequently in this disclosure.

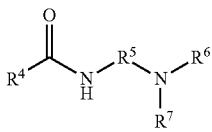

(VI)

In chemical formula (VI), $R^4$ may be a saturated, unsaturated, or cyclic hydrocarbyl having from 3 to 20 carbon atoms, $R^5$ may be a saturated, unsaturated, or cyclic hydrocarbyl having from 2 to 10 carbon atoms, $R^6$ may be hydrogen or a hydrocarbyl having from 1 to 20 carbon atoms, and $R^7$ may be hydrogen or a hydrocarbyl having from 1 to 20 carbon atoms. For example, in some embodiments, $R^5$ may be a saturated hydrocarbyl having 2 carbon atoms, which results in a structure for the amide accelerator shown by chemical formula (VII) provided subsequently in this disclosure.

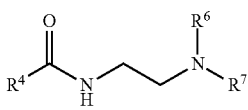

(VII)

In some embodiments, $R^5$ may be a saturated hydrocarbyl having 3 carbon atoms, which results in a structure for the amide accelerator shown in chemical formula (VIII) provided subsequently in this disclosure.

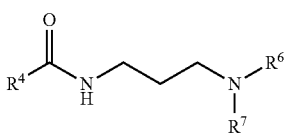

(VIII)

In chemical formulas (VII) and (VIII), $R^4$ may be a saturated, unsaturated, or cyclic hydrocarbyl having from 3 to 20 carbon atoms, $R^6$ may be hydrogen or a hydrocarbyl having from 1 to 20 carbon atoms, and $R^7$ may be hydrogen or a hydrocarbyl having from 1 to 20 carbon atoms, as previous described in this disclosure in relation to chemical formula (VI). In some embodiments, the amide accelerator may be a linear or branched polyamidoamine having repeating units derived from any of chemical formulas (VI), (VII), or (VIII) previously described in this disclosure.

In some embodiments, the amide accelerator may include a carboxylic acid terminated fatty polyamide or a polyaminated fatty acid. In some embodiments, the amide accelerator may be a polyaminated fatty acid having the chemical formula (IX):

(IX)

where $R^8$ is a hydrocarbyl group and $R^9$ is a hydrocarbyl group or an alkylene carboxylate group having formula —$R^{10}$—COOH, where $R^{10}$ is a saturated or unsaturated hydrocarbylene. $R^8$ may be a saturated or unsaturated hydrocarbyl group, such as a saturated alkyl (—$C_yH_{2y+1}$ where y is the number of carbon atoms in $R^8$), an unsaturated alkyl (—$C_yH_{(2y-2z-4w+1)}$ where y is the number of carbon atoms in $R^8$, z is zero or a number of double bonds in $R^8$, and w is zero or a number of triple bonds in $R^8$), an alkenyl (—CH=CH$C_yH_{(2y-2z-4w+1)}$ where y is zero or an integer greater than zero, z is zero or a number of additional double bonds in $R^8$, and w is zero or the number of triple bonds in $R^8$), or an alkynyl (—C≡C$C_yH_{(2y-2z-4w+1)}$ in which y is zero or an integer greater than zero, z is zero or the number of double bonds in $R^8$, and w is zero or a number of additional triple bonds in $R^8$). Each of the general formulas for saturated alkyl, unsaturated alkyl, saturated alkenyl, alkenyl, and alkynyl includes both linear groups and branched groups having 1, 2, 3, 4, 5, or greater than 5 branches at individual carbon atoms. Examples of linear hydrocarbyl groups include, without limitation, linear alkyls of formula —$(CH_2)_yCH_3$ and linear alkenyls of formula —CH=$(CH_2)_yCH_3$ where y is an integer from 0 to 15. Specific examples of linear alkyls include methyl, ethyl, n-propyl, n-butyl, n-hexyl, n-heptyl, n-octyl, n-nonyl, and n-decyl. Specific examples of linear alkenyls include vinyl and allyl. In further examples, $R^8$ may include a cyclic hydrocarbyl group, such as but not limited to a phenyl group, cyclohexyl group, or cycloheptyl group. In embodiments, $R^8$ may be a linear or branched hydrocarbyl group. $R^8$ may have from 1 to 20 carbon atoms (carbons), such as from 1 to 18 carbons, from 1 to 16 carbons, from 1 to 14 carbons, from 1 to 12 carbons, from 1 to 10 carbons, from 6 to 20 carbons, from 6 to 18 carbons, from 6 to 16 carbons, from 6 to 14 carbons, from 6 to 12 carbons, from 6 to 10 carbons, from 8 to 20 carbons, from 8 to 18 carbons, from 8 to 16 carbons, from 8 to 14 carbons, from 8 to 12 carbons, from 8 to 10 carbons, from 10 to 20 carbons, from 20 to 18 carbons, from 10 to 16 carbons, from 10 to 14 carbons, from 10 to 12 carbons, from 12 to 20 carbons, from 12 to 18 carbons, from 12 to 16 carbons, from 12 to 14 carbons, from 14 to 20 carbons, from 14 to 18 carbons, from 14 to 16 carbons, from 16 to 20 carbons, or 13 carbons. In some embodiments, $R^8$ may be a saturated linear hydrocarbyl group. Alternatively, in other embodiments, $R^8$ may be a branched hydrocarbyl group.

As previously described, $R^9$ can be a hydrocarbyl group or an alkylene carboxylate group having formula —$R^{10}$—COOH, where $R^{10}$ is a saturated or unsaturated hydrocarbylene group. In embodiments, $R^9$ may be a saturated or unsaturated hydrocarbyl group, such as a saturated alkyl (—$C_yH_{2y+1}$ where y is the number of carbon atoms in $R^9$), an unsaturated alkyl (—$C_yH_{(2y-2z-4w+1)}$ where y is the number of carbon atoms in $R^9$, z is zero or a number of double bonds in $R^9$, and w is zero or a number of triple bonds in $R^9$), an alkenyl (—CH=CH$C_yH_{(2y-2z-4w+1)}$ where y is zero or an integer greater than zero, z is zero or a number of additional double bonds in $R^9$, and w is zero or the number of triple bonds in $R^9$), or an alkynyl (—C≡C$C_yH_{(2y-2z-4w+1)}$ where y is zero or an integer greater than zero, z is zero or the number of double bonds in $R^9$, and w is zero or a number of additional triple bonds in $R^9$). Each of the general formulas for saturated alkyl, unsaturated alkyl, saturated alkenyl, alkenyl, and alkynyl includes both linear groups and branched groups having 1, 2, 3, 4, 5, or greater than 5 branches at individual carbon atoms. Examples of linear hydrocarbyl groups include, without limitation, linear alkyls having formula —$CH_2)_yCH_3$ and linear alkenyls having formula —CH=$(CH_2)_yCH_3$ where y is an integer from 0 to 15. Specific examples of linear alkyls include methyl, ethyl, n-propyl, n-butyl, n-hexyl, n-heptyl, n-octyl, n-nonyl, and n-decyl. Specific examples of linear alkenyls include vinyl and allyl. In further examples, $R^9$ may include a cyclic hydrocarbyl group, such as but not limited to a phenyl group, cyclohexyl group, or cycloheptyl group. $R^9$ may have from 1 to 10 carbons, such as from 1 to 8 carbons, from 1 to 6 carbons, from 1 to 4 carbons, from 2 to 10 carbons, from 2 to 8 carbons, from 2 to 6 carbons, from 2 to 4 carbons, from 4 to 10 carbons, or from 4 to 8 carbons. In one or more embodiments, $R^9$ may be methyl (—CH$_3$), phenyl (—(C$_6$H$_5$)), or ethyl (—CH$_2$CH$_3$).

Alternatively, in other embodiments, $R^9$ may be an alkylene carboxylate group having formula —R$^{10}$—COOH, where $R^{10}$ is a saturated or unsaturated hydrocarbylene group, such as an alkylene, alkenylene, or a cyclic hydrocarbylene. Cyclix hydrocarbylenes may include aromatic or non-aromatic cyclic hydrocarbylenes, such as but are not limited to, phenyl groups, cyclohexyl groups, or combinations of these. $R^{10}$ may have from 1 to 10 carbons, such as from 1 to 8 carbons, from 1 to 6 carbons, from 1 to 4 carbons, from 2 to 10 carbons, from 2 to 8 carbons, from 2 to 6 carbons, from 2 to 4 carbons, from 4 to 10 carbons, or from 4 to 8 carbons. In some embodiments, $R^{10}$ may be —CH$_2$CH$_2$— or —CH=CH—.

In embodiments, $R^9$ may be selected from the group consisting of methyl, phenyl, —CH$_2$CH$_2$—COOH, and —CH=CH—COOH. For example, in some embodiments, $R^9$ may have the formula —CH=CH—COOH, such that the polyaminated fatty acid compound has formula (X):

R$^8$—CO—NH—CH$_2$—CH$_2$—N(COR$^8$)—CH$_2$—
  CH$_2$—NH—CO—CH=CH—COOH            (X)

where $R^8$ is hydrocarbyl group having from 1 to 20 carbon atoms. In another example, $R^9$ may have the formula —CH$_3$ such that the polyaminated fatty acid compound has the formula (XI):

R$^8$—CO—NH—CH$_2$—CH$_2$—N(COR$^8$)—CH$_2$—
  CH$_2$—NH—CO—CH$_3$            (XI)

where $R^8$ is hydrocarbyl group having from 1 to 20 carbon atoms. In still another example, $R^9$ may be phenyl (—(C$_6$H$_5$)) such that the polyaminated fatty acid compound has the formula (XII):

R$^8$—CO—NH—CH$_2$—CH$_2$—N(COR$^8$)—CH$_2$—
  CH$_2$—NH—CO—(C$_6$H$_5$)            (XII)

where $R^8$ is hydrocarbyl group having from 1 to 20 carbon atoms. In another example, $R^9$ may have the formula —CH$_3$ such that the polyaminated fatty acid compound has the formula (XIII):

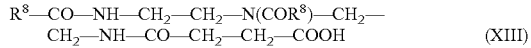

R$^8$—CO—NH—CH$_2$—CH$_2$—N(COR$^8$)—CH$_2$—
  CH$_2$—NH—CO—CH$_2$—CH$_2$—COOH            (XIII)

where $R^8$ is hydrocarbyl group having from 1 to 20 carbon atoms.

The polyaminated fatty acid may be synthesized by a two-step process. In the first step, a fatty acid is reacted with diethylene triamine (DETA) to produce an amide and water. The fatty acid has the general chemical formula $R^8$—COOH, where $R^8$ is the hydrocarbyl group previously described with respect to formula (IX).

The fatty acid having formula $R^8$—COOH may be a naturally derived or a synthetically derived fatty acid. The fatty acid may be a naturally occurring fatty acid, such as a fatty acid derived from natural sources, example of which may include animal fats or vegetable oils. The fatty acid may be produced through hydrolysis of triglycerides, phospholipids, or both triglycerides and phospholipids and removal of glycerol. The triglycerides and phospholipids may be derived from natural sources such as animal fats or vegetable fats. Triglycerides and phospholipids from plant-based sources may include but are not limited to coconut oil, palm oil, soybean oil, tall oil, tall oil fatty acids (TOFA), or combinations of these sources. In some examples, the fatty acid may be a saturated fatty acid resulting from hydrogenation of a naturally derived unsaturated fatty acid. Alternatively, the fatty acid may be a synthetic fatty acid prepared from a petroleum source or other source through one or more synthesis reactions. In examples, the fatty acid may be a synthetic fatty acid derived through hydrocarboxylation of alkenes. Non-limiting examples of fatty acids may include, but are not limited to, caprylic acid, capric acid, lauric acid, myristic acid, palmitic acid, stearic acid, arachidic acid, myristoleic acid, palmitoleic acid, sapienic acid, oleic acid, elaidic acid, vaccenic acid, linoleic acid, linoelaidic acid, α-linoleic acid, arachidonic acid, eicosapentaenoic acid, or combinations of any of these fatty acids. Other naturally occurring or synthetic fatty acids are also contemplated. In some embodiments, the fatty acid may be tall oil fatty acid. Tall oil fatty acid may include at least one of palmitic acid, oleic acid, linoleic acid, or combinations of these. In embodiments, the fatty acid may be a tall oil fatty acid derived from distillation of crude tall oil. In one or more embodiments, the fatty acid may include a hydrocarbyl group ($R^8$) having from 12 to 14 carbon atoms. Some example polyaminated fatty acid compounds may be made using a saturated linear fatty acid having a saturated linear hydrocarbyl group $R^8$ with 12 carbon atoms.

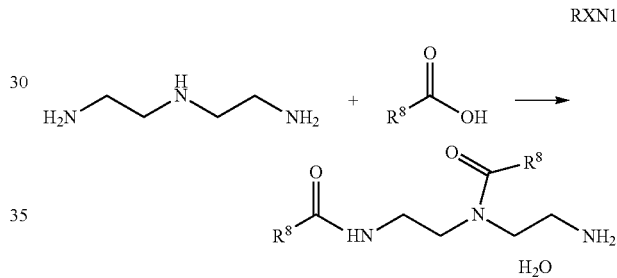

RXN1

In the first reaction step, DETA may be reacted with the fatty acid to produce an intermediate fatty acid amide and water. The reaction for the first step in synthesizing the polyaminated fatty acid is provided subsequently in reaction (RXN1).

In the second step of synthesizing the polyaminated fatty acid, the intermediate fatty acid amide synthesized in the first step according to reaction (RXN1) may be further reacted with an acid anhydride, such as but not limited to maleic anhydride, acetic anhydride, benzoic anhydride, or succinic anhydride, to form the polyaminated fatty acid. In an example synthesis reaction of the second compound, the acid anhydride may be maleic anhydride. The reaction for the second step using maleic anhydride as the acid anhydride to prepare the compound of formula (X) is provided as reaction (RXN2).

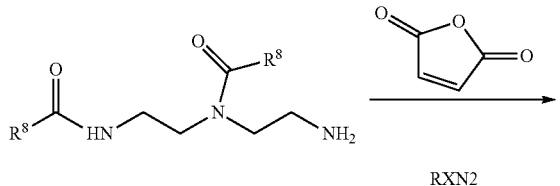

RXN2

-continued

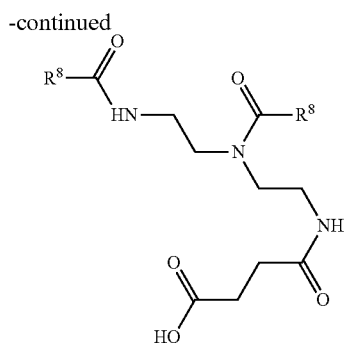

In an analogous manner to reaction (RXN2), if maleic anhydride in reaction (RXN2) is replaced with acetic anhydride, the product is the compound of formula (XI). Likewise, if maleic anhydride in reaction (RXN2) is replaced with benzoic anhydride, the product is the compound of formula (XII). Additionally, if maleic anhydride in reaction (RXN2) is replaced with succinic anhydride, the product is the compound of formula (XIII).

In some embodiments, the amide accelerator may be dispersed in a solvent, such as, but not limited to, water, an organic solvent, or combinations of these. Organic solvents may include, but are not limited to, diesel, biodiesel, mineral oil, plant-based oils, ethers, paraffinic solvents, esters, alcohols, or combinations of these. Plant-based oils may include soybean oil, tall oil, or combinations of these. Ethers may include, but are not limited to, ethylene glycol monobutyl ether, diethylene glycol monobutyl ether, or combinations of these. Alcohol solvents may include but are not limited to ethanol, propanol, isopropanol, butanol, pentanol, or combinations of these.

The LCM compositions may have an amount of the amide accelerator sufficient to reduce the cure time of the epoxy resin system in the LCM compositions. However, too much of the amide accelerator in the LCM compositions may reduce the cure time such that the LCM composition may cure or set in the injection equipment before it can be injected into the lost circulation zone. The LCM compositions may have an amount of the amide accelerator sufficient to reduce the curing time while maintaining the ability of the LCM composition to be pumped and injected into the lost circulation zone. The LCM compositions may have greater than or equal to 0.1 wt. %, greater than or equal to 0.5 wt. %, or even greater than or equal to 1.0 wt. % amide accelerators based on the total weight of the LCM composition before curing. In some embodiments, the LCM composition may have from 0.1 wt. % to 20 wt. % amide accelerator based on the total weight of the LCM composition before curing. In some embodiments, the LCM composition may have from 0.1 wt. % to 18 wt. %, from 0.1 wt. % to 15 wt. %, from 0.1 wt. % to 10 wt. %, from 0.5 wt. % to 20 wt. %, from 0.5 wt. % to 18 wt. %, from 0.5 wt. % to 15 wt. %, from 0.5 wt. % to 10 wt. %, from 1 wt. % to 20 wt. %, from 1 wt. % to 18 wt. %, from 1 wt. % to 15 wt. %, from 1 wt. % to 10 wt. %, or from 1 wt. % to 7 wt. % amide accelerators based on the total weight of the LCM composition before curing. The cure time of the LCM compositions may be controlled by increasing or decreasing the amount of the amide accelerators in the LCM compositions.

In some embodiments, the LCM compositions may include other modifiers, such as but not limited to cardanol liquid, polyacrylate flow agents, or combinations of these. Modifiers may be added to the LCM composition to modify one or more properties of the LCM composition, such as but not limited to viscosity, yield point (YP), plastic viscosity (PV), gel strength, density, or combinations of these.

As discussed previously in the present disclosure, the LCM compositions can include one or more weighting materials to increase the density of the LCM composition. The weighting materials may be particulate solids having a specific gravity (SG) that increases the density of the LCM compositions. The increased density of the LCM composition may increase the hydrostatic pressure exerted by the LCM composition on the formation when initially transferred or injected into the lost circulation zone. This may further reduce or prevent loss of the LCM composition to the lost circulation zone until the LCM is cured enough to resist further flow into the formation. The weighting material may also increase the final density of the cured LCM composition. The target final density of the cured LCM composition may depend on the geology of the subterranean formation in the lost circulation zone being treated.

The weighting material may have a specific gravity (SG) of from 2 to 6. Examples of weighting materials may include, but are not limited to, sand, barite (barium sulfate), hematite, siderite, ilmenite, silica sand, manganese oxide (MnO), hausmanite (manganese tetraoxide ($Mn_3O_4$), zinc oxide, zirconium oxide, iron oxide, fly ash, or any combination of these weighting materials. In some embodiments, LCM compositions may include barite, manganese tetraoxide ($Mn_3O_4$), or combinations of these.

The LCM composition may include an amount of weighting material that increases the density of the LCM composition. In some embodiments, the LCM composition may include from 0.1 wt. % to 60 wt. % weighting material based on the total weight of the LCM composition prior to curing. For example, in some embodiments, the LCM composition may include from 0.1 wt. % to 50 wt. %, from 0.1 wt. % to 40 wt. %, from 0.1 wt. % to 30 wt. %, from 1 wt. % to 60 wt. %, from 1 wt. % to 50 wt. %, from 1 wt. % to 40 wt. %, from 1 wt. % to 30 wt. %, from 5 wt. % to 60 wt. %, from 5 wt. % to 50 wt. %, from 5 wt. % to 40 wt. %, from 5 wt. % to 30 wt. %, from 10 wt. % to 60 wt. %, from 10 wt. % to 50 wt. %, from 10 wt. % to 40 wt. %, or from 20 wt. % to 60 wt. % weighting material based on the total weight of the LCM composition before curing.

In one or more embodiments, the LCM compositions for treating lost circulations zones in wellbores may include from 15 weight percent (wt. %) to 75 wt. % epoxy resins, from 1 wt. % to 25 wt. % curing agents, from 0.1 wt. % to 20 wt. % amide accelerator, and from 20 wt. % to 80 wt. % calcium carbonate based on the total weight of the LCM composition, where the calcium carbonate has an average particle size of from 1,000 microns to 10,000 microns. The amide accelerator includes at least one amide functional group. In some embodiments, the amide accelerator may additionally include an amine functional group. The epoxy resins may include one or more than one of the epoxy resins previously described in this disclosure. The curing agents may include one or a plurality of curing agents previously described in this disclosure. The amide accelerator may include one or a plurality of the amide accelerators described in this disclosure. The calcium carbonate may be calcium carbonate flakes. The LCM compositions may optionally include one or a plurality of weighting materials. The LCM compositions may have a density of from 63 pounds of mass per cubic foot ($lbm/ft^3$) (1009 kilograms per cubic meter ($kg/m^3$)) to 160 $lbm/ft^3$ (2563 $kg/m^3$). The LCM compositions may have a curing time less than or equal to 48 hours, less than or equal to 24 hours, less than or equal to 12 hours, less than or equal to 8 hours, or even less than or equal to 4 hours. The LCM composition may include any other constituent, property, or characteristic previously described in this disclosure for the LCM composition.

In one or more embodiments, the LCM composition for sealing lost circulations zones in wellbores may consist of or consist essentially of from 15 wt. % to 75 wt. % epoxy resins, from 1 wt. % to 25 wt. % curing agents, from 0.1 wt. % to 20 wt. % amide accelerator, from 20 wt. % to 80 wt. % calcium carbonate having an average particle size of from 1,000 microns to 10,000 microns, and, optionally, one or more weighting materials, cardinal liquid, polyacrylate flow agents, or combinations of these, where the weight percentages are based on the total weight of the LCM composition. The amide accelerator includes at least one amide functional group and may optionally include at least one amine functional group. The LCM compositions may have a density of from 63 lbm/ft$^3$ (1009 kg/m$^3$) to 160 lbm/ft$^3$ (2563 kg/m$^3$). The epoxy resins may include one or more than one of the epoxy resins described in this disclosure. The curing agents may include one or a plurality of curing agents described in this disclosure. The amide accelerator may include one or a plurality of the amide accelerators described in this disclosure. The calcium carbonate may be calcium carbonate flakes. The LCM compositions may have a curing time less than or equal to 48 hours, less than or equal to 24 hours, less than or equal to 12 hours, less than or equal to 8 hours, or even less than or equal to 4 hours. The LCM composition may include any other constituent, property, or characteristic previously described in this disclosure for the LCM composition.

In some embodiments, the LCM compositions may be substantially free of proppants. As used in this disclosure, the term "proppant" may refer to solid materials that are used in hydraulic fracturing to "prop" open pores of a subterranean formation and may include but are not limited to sand or ceramic particles operable to maintain fractured pores of a subterranean formation open. In some embodiments, the LCM compositions may include less than 0.1 wt. % proppants, such as sand or ceramic particles, based on the total weight of the LCM composition. In some embodiments, the LCM composition may be substantially free of conventional cements and cement binders.

The initial dynamic viscosity of the LCM compositions may be modified by changing the type of epoxy resins and curing agents included in the LCM composition, or by changing the relative amounts of the epoxy resins, curing agents, calcium carbonate, or combinations of these, in the LCM compositions. In one or more embodiments, the dynamic viscosity of the LCM compositions may be modified by changing the type, amount, or both, of epoxy resins in the LCM composition. For example, the dynamic viscosity of the LCM composition may be decreased by adding or increasing an amount of an epoxy resin that has a lesser dynamic viscosity compared to other epoxy resins capable of being incorporated into the LCM compositions. The incorporation of an epoxy resin having a lesser dynamic viscosity may result in a greater cure time for the epoxy resin. In these instances, the cure time of the LCM compositions may be reduced by modifying the type or amount of the amide accelerators in the LCM composition.

The LCM compositions may have an initial dynamic viscosity sufficient to enable the LCM compositions to be pumped and injected into the lost circulation zone. The initial dynamic viscosity of the LCM compositions may refer to the dynamic viscosity of the LCM composition measured immediately after addition of the curing agent to the LCM composition and before any substantial curing has occurred. In some embodiments, the LCM composition may have an initial dynamic viscosity within a range of from 5 pounds of force second per square foot (lbf*s/ft$^2$) to 300 lbf*s/ft$^2$ (equivalent to 24 kPa*s to 1,436 kPa*s, where 1 pound force second per square foot is equal to 4.78826 kPa*s). In some embodiments, the LCM composition may have an initial dynamic viscosity of from 24 kPa*s to 1200 kPa*s, from 24 kPa*s to 1000 kPa*s, from 24 kPa*s to 500 kPa*s, from 50 kPa*s to 1436 kPa*s, from 50 kPa*s to 1200 kPa*s, from 50 kPa*s to 1000 kPa*s, from 50 kPa*s to 500 kPa*s, from 100 kPa*s to 1436 kPa*s, from 100 kPa*s to 1200 kPa*s, from 100 kPa*s to 1000 kPa*s, or from 100 kPa*s to 500 kPa*s.

The epoxy resins in the LCM compositions are initially in liquid form. As previously described in this disclosure, the epoxy resins build viscosity during curing and eventually cure to form a non-porous three-dimensional network. In some embodiments, the LCM compositions may have a cure time of less than or equal to 48 hours, less than or equal to 24 hours, less than or equal to 12 hours, less than or equal to 8 hours, or even less than or equal to 4 hours. In other embodiments, the LCM compositions may have a cure time of from 0.5 hour to 48 hours, from 0.5 hour to 24 hours, from 0.5 hour to 12 hours, from 0.5 hour to 8 hours, from 0.5 hour to 4 hours, from 1 hour to 48 hours, 1 hour to 24 hours, from 1 hour to 12 hours, from 1 hour to 8 hours, or from 1 hour to 4 hours. As previously discussed, the cure time of the LCM composition may be adjusted by increasing or decreasing the amount of the amide accelerators in the LCM composition.

The rheology and density of the LCM compositions can be adjusted over a wide range of values depending on the requirement for the well and the downhole conditions of the well. The LCM compositions may have a density that enables the LCM compositions to exert hydrostatic pressure on the formation when introduced to the lost circulation zone. The LCM compositions may have a density of from 63 pounds of mass per cubic foot (lbm/ft$^3$) (1009 kilograms per cubic meter (kg/m$^3$)) to 160 lbm/ft$^3$ (2563 kg/m$^3$). The density of the LCM compositions may be determined immediately after addition of the curing agent and before substantial curing has occurred, such as within 30 minutes after adding the curing agent to the LCM composition. The density of the LCM composition may change as curing of the epoxy resin system transitions the LCM composition from a liquid to a semi-solid or solid. In one or more embodiments, the LCM composition may have a density of from 63 lbm/ft$^3$ to 150 lbm/ft$^3$, from 63 lbm/ft$^3$ to 140 lbm/ft$^3$, from 63 lbm/ft$^3$ to 120 lbm/ft$^3$, from 70 lbm/ft$^3$ to 160 lbm/ft$^3$, from 70 lbm/ft$^3$ to 150 lbm/ft$^3$, from 70 lbm/ft$^3$ to 140 lbm/ft$^3$, from 70 lbm/ft$^3$ to 120 lbm/ft$^3$, from 90 lbm/ft$^3$ to 160 lbm/ft$^3$, from 90 lbm/ft$^3$ to 150 lbm/ft$^3$, from 90 lbm/ft$^3$ to 140 lbm/ft$^3$, from 90 lbm/ft$^3$ to 120 lbm/ft$^3$, from 100 lbm/ft$^3$ to 160 lbm/ft$^3$, from 100 lbm/ft$^3$ to 150 lbm/ft$^3$, from 100 lbm/ft$^3$ to 140 lbm/ft$^3$, or from 100 lbm/ft$^3$ to 120 lbm/ft$^3$.

The LCM compositions may have a gel strength before curing that maintains the pump-ability of the LCM compositions to prevent stuck-pipe problems and that may enable the LCM compositions to be pumped and injected into the lost circulation zone. In some embodiments, the LCM compositions may have a density of greater than 90 lbm/ft$^3$, or greater than 120 lbm/ft$^3$, and may have a gel strength that enables the LCM composition to suspend the calcium carbonate added to the LCM compositions. The LCM compositions may have a gel strength before curing that prevents the LCM compositions from flowing further into the formation after injection of the LCM compositions into the lost circulation zone. The LCM compositions may have a 10-second gel strength of from 0.1 pound of force per square foot (lbf/100 ft$^2$) to 290 lbf/100 ft$^2$, from 0.1 lbf/100 ft$^2$ to 250 lbf/100 ft$^2$, from 0.1 lbf/100 ft$^2$ to 200 lbf/100 ft$^2$, from 1 lbf/100 ft$^2$ to 290 lbf/100 ft$^2$, from 1 lbf/100 ft$^2$ to 250 lbf/100 ft$^2$, from 1 lbf/100 ft$^2$ to 200 lbf/100 ft$^2$, from 10 lbf/100 ft$^2$ to 290 lbf/100 ft$^2$, from 10 lbf/100 ft$^2$ to 250 lbf/100 ft$^2$, from 10 lbf/100 ft$^2$ to 200 lbf/100 ft$^2$, or from 10 lbf/100 ft$^2$ to 100 lbf/100 ft$^2$ measured immediately after addition of the curing agent and before substantial curing has taken place, such as within 30 minutes of adding the curing agent to the LCM composition. In one or more embodiments, the LCM compositions may have a 10-minute gel strength of from 0.1 lbf/100 ft$^2$ to 290 lbf/100 ft$^2$, from 0.1 lbf/100 ft$^2$ to 250 lbf/100 ft$^2$, from 0.1 lbf/100 ft$^2$ to 200 lbf/100 ft$^2$, from 0.1 lbf/100 ft$^2$ to 100 lbf/100 ft$^2$, from 1 lbf/100 ft$^2$ to 290 lbf/100 ft$^2$, from 1 lbf/100 ft$^2$ to 250 lbf/100 ft$^2$, from 1 lbf/100 ft$^2$ to 200 lbf/100 ft$^2$, from 1 lbf/100 ft$^2$ to 100 lbf/100 ft$^2$, from 10 lbf/100 ft$^2$ to 290 lbf/100 ft$^2$, from 10 lbf/100 ft$^2$ to 250 lbf/100 ft$^2$, from 10 lbf/100 ft$^2$ to 200 lbf/100 ft$^2$, from 10 lbf/100 ft$^2$ to 100 lbf/100 ft$^2$, from 100 lbf/100 ft$^2$ to 290 lbf/100 ft$^2$, or from 100 lbf/100 ft$^2$ to 250 lbf/100 ft$^2$ measured immediately after addition of the curing agent and before substantial curing has taken place, such as within 30 minutes of adding the curing agent to the LCM composition. The 10-second gel strength and 10-minute gel strength may be determined according to the test methods subsequently described in this disclosure.

The plastic viscosity (PV) of a fluid relates to the resistance of a fluid to flow due to mechanical interaction between the solids of the fluid and represents the viscosity of the fluid extrapolated to infinite shear rate. The LCM compositions of the present disclosure may have a PV that enables the LCM compositions to be injected into the lost circulation zone, such as a high-injectivity lost circulation zone. The PV of the LCM compositions may be measured immediately after addition of the curing agent and before substantial curing has taken place, such as within 30 minutes of adding the curing agent to the LCM composition. The PV of the LCM compositions may be determined in accordance with the test methods subsequently described in this disclosure. The LCM compositions may have a PV of from 0.1 centipoise (cP) to 290 cP, from 0.1 cP to 250 cP, from 0.1 cP to 200 cP, from 0.1 cP to 100 cP, from 1 cP to 290 cP, from 1 cP to 250 cP, from 1 cP to 200 cP, from 1 cP to 100 cP, from 5 cP to 290 cP, from 5 cP to 250 cP, from 5 cP to 200 cP, from 5 cP to 100 cP, from 50 cP to 290 cP, from 50 cP to 250 cP, from 50 cP to 200 cP, from 50 cP to 100 cP, or from 100 cP to 290 cP measured immediately after addition of the curing agent and before substantial curing has taken place (1 cP=1 millipascal second (mPa-s). The PV of the LCM compositions may depend on the quantity of calcium carbonate and other solids added to the LCM compositions. For example, increasing the amount of calcium carbonate in the LCM compositions may increase the PV of the LCM compositions.

The yield point (YP) of a fluid relates to the amount of stress required to move the fluid from a static condition. The LCM compositions of the present disclosure may have a YP that may prevent the LCM composition from flowing further into the formation once the LCM composition has been introduced to the formation. The LCM compositions may have a YP that enables the LCM composition to suspend the calcium carbonate and other solids in the LCM composition and reduce or prevent settling of the calcium carbonate and other solids. The LCM compositions may have a YP of from 0.1 lbf/100 ft$^2$ to 400 lbf/100 ft$^2$, from 0.1 lbf/100 ft$^2$ to 300 lbf/100 ft$^2$, from 0.1 lbf/100 ft$^2$ to 200 lbf/100 ft$^2$, from 0.1 lbf/100 ft$^2$ to 100 lbf/100 ft$^2$, from 0.1 lbf/100 ft$^2$ to 10 lbf/100 ft$^2$, from 1 lbf/100 ft$^2$ to 400 lbf/100 ft$^2$, from 1 lbf/100 ft$^2$ to 300 lbf/100 ft$^2$, from 1 lbf/100 ft$^2$ to 200 lbf/100 ft$^2$, from 1 lbf/100 ft$^2$ to 100 lbf/100 ft$^2$, from 1 lbf/100 ft$^2$ to 10 lbf/100 ft$^2$, from 10 lbf/100 ft$^2$ to 400 lbf/100 ft$^2$, from 10 lbf/100 ft$^2$ to 300 lbf/100 ft$^2$, from 10 lbf/100 ft$^2$ to 200 lbf/100 ft$^2$, from 10 lbf/100 ft$^2$ to 100 lbf/100 ft$^2$, from 100 lbf/100 ft$^2$ to 400 lbf/100 ft$^2$, from 100 lbf/100 ft$^2$ to 300 lbf/100 ft$^2$, from 100 lbf/100 ft$^2$ to 200 lbf/100 ft$^2$, from 200 lbf/100 ft$^2$ to 400 lbf/100 ft$^2$, or from 300 lbf/100 ft$^2$ to 400 lbf/100 ft$^2$.

The epoxy resins of the LCM compositions, once cured, may be more chemically resistant than conventional cement compositions. For example, the fluids from the subterranean formation, such as hydrocarbon gases, crude oil, or produced water, may include hydrogen sulfide gas ($H_2S$), which is highly corrosive. In some embodiments, the cured epoxy polymers of the LCM compositions of the present disclosure may be resistant to corrosion caused by ($H_2S$) gas present in fluids in the subterranean formation.

The LCM compositions may be used for sealing lost circulation zones in a wellbore under a range of different downhole conditions. For example, in some embodiments, the LCM composition may be adapted to different downhole conditions by changing the concentrations of the epoxy resin, the curing agents, the amide accelerators, or the calcium carbonate in the LCM compositions to modify the specific gravity, viscosity, mechanical properties, curing time, or other properties of the LCM compositions. The LCM compositions may be capable of withstanding a wide range of temperatures and pressures without failing or deteriorating, which would allow liquids or gases to penetrate into or through the LCM compositions. As a non-limiting example, the LCM compositions, once cured, may be capable of withstanding temperatures of from 20 degrees Celsius (° C.) to 205° C. The cured LCM compositions may also be able to withstand temperature cycling within a temperature range of from 20° C. to 205° C. The cured LCM compositions may be capable of withstanding pressures of up to 4,000,000 psi (27,580 megapascals (MPa)) (1 psi equals 0.00689476 MPa). For example, in some embodiments, the cured LCM compositions may be capable of withstanding pressures of from 14 psi (96 kPa or 0.096 MPa) to 4,000,000 psi (27,580 MPa) without failing or deteriorating to allow liquids or gases to penetrate into or through the LCM compositions.

The LCM compositions may be used in a method of treating a lost circulation zone of a wellbore. A method of treating a lost circulation zone of a wellbore may include introducing the LCM composition into the lost circulation zone and curing the LCM composition in the lost circulation zone to produce a barrier operable to prevent wellbore fluids from passing into the lost circulation zone. The LCM composition may include the epoxy resin, the curing agent, the amide accelerator, and the calcium carbonate having an average particle size of from 1,000 microns to 10,000 microns. The epoxy resin may include at least one of 2,3-epoxypropyl-o-tolyl ether, C12-C14 alkyl glycidyl ether, 1,6-hexanediol diglycidyl ether, butyl glycidyl ether, cyclohexanedimethanol diglycidyl ether. The amide accelerator may include at least one amide functional group. The amide accelerators may also include at least one amine functional group. The epoxy resins may include one or more than one of the epoxy resins described in this disclosure. The curing agents may include one or a plurality of curing agents described in this disclosure. The amide accelerator may include one or a plurality of the amide accelerators described in this disclosure. The calcium carbonate may include calcium carbonate flakes. The calcium carbonate may have an average particle size of from 4,000 microns to 10,000 microns.

The LCM composition injected into the lost circulation zone may include from 30 wt. % to 80 wt. % calcium carbonate, from 15 wt. % to 70 wt. % epoxy resin, from 1 wt. % to 25 wt. % curing agent, from 0.1 wt. % to 20 wt. % amide accelerator, or combinations of these, where the weight percent is based on the total weight of the LCM composition before any substantial curing. The LCM composition may include from 0.1 weight percent to 50 weight percent weighting material based on the total weight of the LCM composition. The LCM composition may have a density of from 1000 kilograms per cubic meter to 2600 kilograms per cubic meter. The LCM composition may have a cure time of from greater than 0 hours to less than 48 hours. The LCM composition may include any other constituent, property, or characteristic previously described in this disclosure for the LCM compositions. After curing, the lost circulation zone may be isolated from the other portions of the wellbore by the cured LCM composition.

In one or more embodiments, the lost circulation zone may be a high-injectivity zone having an injectivity factor of less than or equal to 4000 pounds of force per square inch*min per barrel, in which a barrel is equal to 42 United States (U.S.) Gallons and the injectivity factor is defined as the quotient of the injection pressure in pounds of force per square inch divided by the injection rate in barrels per minute. The lost circulation zone may be a high-injectivity zone having a fluid loss rate of from 100 barrels per hour to 1000 barrels per hour.

The method may further include introducing a spacer fluid into the lost circulation zone before introducing the LCM composition. In some embodiments, the LCM composition may not be compatible with the drilling fluid or other fluid present in the wellbore. The spacer fluid may displace the fluid present in the wellbore before the LCM composition is pumped into the well bore. The spacer fluid may maintain the LCM composition separate from the fluids already present in the wellbore to reduce or prevent degradation of the LCM composition, fluid in the wellbore or both. The spacer fluid may be compatible with the fluids present in the wellbore as well as the LCM compositions. The method may further include introducing a displacement fluid after the LCM composition to displace the LCM composition into the lost circulation zone. The displacement fluid may push the LCM composition into the lost circulation to increase the amount of LCM composition in the lost circulation zone and reduce curing of the LCM composition in the wellbore, in particular in completed portions of the wellbore closer to the surface. In some embodiments, a packer may be utilized to direct placement of the LCM composition into the lost circulation zone. The method may further include drilling through at least a portion of the barrier formed by the cured LCM composition to continue drilling the wellbore. In some embodiments, one or more subsequent treatments with the LCM composition may be conducted to fully treat the lost circulation zone.

Test Methods

Viscosity

The viscosity of the LCM compositions may be measured using a standard oilfield viscometer, such as a FANN® Model 35 viscometer manufactured by Fann Instrument Company for example, according to test methods provided in the American Petroleum Institute (API) Recommended Practice For Cementing (RP 10B). The viscosity is reported as shear stress in units of pounds of force per 100 square feet (lbf/100 ft$^2$). The viscometer may also be used to measure the shear rate of the LCM compositions.

Gel Strength

The gel strength refers to the shear stress of the LCM composition measured at a reduced shear rate following a defined period of time during which LCM composition is maintained in a static state. The shear stress of the composition at reduced shear rate may be measured using a standard oilfield viscometer, such as a FANN® Model 35 viscometer operated at reduced rotations per minute (rpm), such as at 3 rpm, according to the test methods described in API Recommended Practice On Determining the Static Gel Strength of Cement Formulations (RP 10B-6/ISO 10426-6: 2008). To measure the gel strength of a composition, the composition is first stirred by contacting the composition with the spindle of the viscometer and operating the viscometer at 600 rotations per minute (rpm). The viscometer is then turned off for a period of time (time period). For a 10-second gel strength, the time period is 10 seconds, and for a 10-minute gel strength, the time period is 10 minutes. It should be understood that other time periods for measuring gel strength may be used as reference times for measurements of gel strength. During the time period, the composition comes to rest in a static state. Upon expiration of the time period, the viscometer is turned back on at a reduced speed, such as 3 rpm for example, to generate a reduced shear rate. The viscometer reading is then taken. The gel strengths of the LCM compositions are reported in units of pounds of force per 100 square feet (lbf/100 ft$^2$).

Plastic Viscosity (PV) and Yield Point (YP)

The rheology of the LCM compositions may be modeled based on Bingham plastic flow behavior. In particular, the LCM compositions may behave as a rigid body at lesser shear stress but flow as a viscous fluid at greater shear stress. The rheological behavior of the compositions may be determined by measuring the shear stress on the composition at different shear rates, which may be accomplished by measuring the shear stress, the shear rate, or both on the composition using a FANN® Model 35 viscometer operated at 3 rpm, 6 rpm, 100 rpm, 200 rpm, 300 rpm, or 600 rpm, for example. The rheology of LCM compositions may be evaluated from the plastic viscosity (PV) and the yield point (YP), which are parameters from the Bingham plastic rheology model. The PV is related to the resistance of the composition to flow due to mechanical interaction between the solids of the composition and represents the viscosity of the composition extrapolated to infinite shear rate. The PV reflects the type and concentration of the solids, such as the calcium carbonate, in the LCM composition. The PV of the LCM compositions may be estimated by measuring the shear stress of the composition using a FANN® Model 35 viscometer at spindle speeds of 300 rotations per minute (rpm) and 600 rpm and subtracting the 300 rpm viscosity measurement from the 600 rpm viscosity measurement according to Equation 3 (EQU. 3), which is subsequently provided. The PV values determined for the LCM compositions are provided in this disclosure in units of centipoise (cP).

$$PV = (\text{viscosity at 600 rpm}) - (\text{viscosity at 300 rpm}) \qquad \text{EQU. 3}$$

The PV may also be determined from dial readings at any two spindle speeds according to the Equation 4 (EQU. 4), which is subsequently provided.

$$PV = \frac{300}{(N_2 - N_1)}(X_{N_2} - X_{N_1}) \qquad \text{EQU. 4}$$

In EQU. 4, $N_1$ is a slower spindle speed of a viscometer and $N_2$ is a greater spindle speed of the viscometer. The term $X_{N1}$ at spindle speed $N_1$, and $X_{N2}$ is the viscometer reading at spindle speed $N_2$.

At shear stress less than the YP of the LCM composition, the LCM composition behaves as a rigid body, and at shear stress greater than the YP of the LCM composition, the LCM composition flows as a viscous fluid. In other words, the YP represents the amount of stress required to move a fluid from a static condition. The YP is determined by extrapolating the Bingham plastic rheology model to a shear rate of zero. The YP of the LCM compositions may be estimated from the PV from EQU. 3 by subtracting the PV from the shear stress measured at 300 rpm according to Equation 5 (EQU. 5), which is provided subsequently.

$$YP = (300 \text{ rpm reading}) - PV \qquad \text{EQU. 5}$$

The YP calculated from EQU. 5 is expressed as a force per area, such as pounds of force per one hundred square feet (lbf/100 ft²) for example. The methods for measuring and determining PV and YP for the LCM compositions are consistent with methods conventionally used for other drilling fluids in general.

EXAMPLES

The following examples illustrate one or more features of the present disclosure. It should be understood that these examples are not intended to limit the scope of the disclosure or the appended claims in any manner. In these Examples, Table 1 is subsequently included in this disclosure and provides a cross-reference for the epoxy resins utilized in the LCM compositions evaluated in these Examples.

TABLE 1

Cross-Reference of Epoxy Resins

| Epoxy Resin ID | Epoxy Resin Name |
| --- | --- |
| Resin 1 | bisphenol-A-epichlorohydrin epoxy resin with the reactive diluent oxirane mono [(C12-C14)-alkyloxy)methyl] derivatives. |
| Resin 2 | C12-C14 alkyl glycidyl ether |
| Resin 3 | 80 wt. % Resin 1 and 20 wt. % Resin 2 |

Example 1: Rheological Properties of Epoxy Resins

Resin 1 and Resin 3 (80:20 mixture of Resin 1 and Resin 2 by weight) were evaluated for rheological properties according to the test methods previously described in this disclosure. In particular, the viscosity data for Resin 1 and Resin 3 were determined using a FANN® 35 rheometer operated at a temperature of 75° F. The rheological properties of the Resin 1 and Resin 3 were determined without addition of the curing agent, weighting material, or other additives. The rheological properties measured for Resin 1 and Resin 3 are shown in Table 2, which is subsequently provided in this disclosure.

TABLE 2

Rheological Properties of Resin 1 and Resin 3

| Rheological Property | Resin 1 | Resin 3 |
| --- | --- | --- |
| Shear Stress at 600 rpm (lbf/100 ft²) | * | * |
| Shear Stress at 300 rpm (lbf/100 ft²) | * | 265 |
| Shear Stress at 200 rpm (lbf/100 ft²) | * | 175 |
| Shear Stress at 100 rpm (lbf/100 ft²) | * | 90 |
| Shear Stress at 6 rpm (lbf/100 ft²) | 21 | 6 |
| Shear Stress at 3 rpm (lbf/100 ft²) | 10 | 3 |

* shear stress values were greater than the measureable range of the rheometer

As shown in Table 2, Resin 3, which included a mixture of Resin 1 and Resin 2, exhibited lesser rheology as shown by the lesser shear stress values over the range of 3 rpm to 300 rpm compared to the shear stress values for Resin 1. As demonstrated by the results in Table 2, the properties of the sealing compositions, LCM compositions, or both may be adjusted by adding or substituting different epoxy resins. For example, by combining Resin 2 with Resin 1, the viscosities of the epoxy resin system and the resulting LCM compositions can be reduced.

Examples 2-4: Thickening Time Tests for LCM Compositions Comprising Calcium Carbonate Flakes and Amide Accelerator In Examples 2-4, thickening time tests for an LCM composition according to the present disclosure and having calcium carbonate flakes and an amide accelerator were performed. The compositions of the LCM compositions of Examples 2-4 are provided in Table 3 subsequently provided in this disclosure. For Examples 2-4, the LCM compositions were prepared by combining Resin 1, Resin 2, and the calcium carbonate flakes. The calcium carbonate flakes were SOLUFLAKE™ flaked calcium carbonate having an average particle size of from 1000 to 10,000 microns obtained from Baker Hughes. Last, the curing agent and the amide accelerator were added. The curing agent was diethylenetriamine (DETA), which was RAZEEN® Cure curing agent (90-100% DETA) obtained from Jubail Chemical Industries LLC of Jubail, Saudi Arabia. The amide accelerator was a polyaminated fatty acid having chemical formula (X):

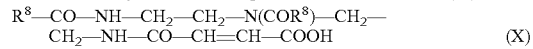

$$R^8-CO-NH-CH_2-CH_2-N(COR^8)-CH_2-CH_2-NH-CO-CH=CH-COOH \qquad (X)$$

in which $R^8$ was a saturated hydrocarbyl having from 16 to 18 carbon atoms. The polyaminated fatty acid of the amide accelerator of Examples 2-4 was prepared from distilled tall oil fatty acid, DETA, and maleic anhydride according to the synthesis process previous described in the present disclosure in relation to RXN1 and RXN2.

The amount of curing agent was increased from 9 grams in Example 2 to 11 grams in Example 3 and 12 grams in Example 4. After adding the curing agent and the amide accelerator, each of the LCM compositions of Examples 2-4 were mixed for 5 minutes. The density of the LCM compositions were measured to be 82 lb/ft³ (1314 kg/m³).

The thickening time tests were conducted under conditions simulating downhole temperature and pressure conditions using a high temperature high pressure (HTHP) consistometer obtained from Chandler Engineering. The LCM compositions of each of Examples 2-4 were introduced to the HTHP consistometer, and the temperature and pressure of the LCM compositions were gradually increased over a period of 35 minutes. The temperature of the LCM composition was increased to a temperature of 163 degrees Fahrenheit (° F.) (72.8° C.) to simulate a bottom hole circulating temperature (BHCT) of 72.8° C., and the pressure was ramped up to a final pressure of 5700 pounds per square inch (psi) (39,300 kPa). The thickening time and Bearden consistency were measured using the HTHP consistometer. Thickening time and Bearden Consistency for each of Examples 2-4 are in Table 3, provided subsequently in this disclosure.

TABLE 3

Formulations and thickening time test results for the LCM compositions of Examples 2-4

| Constituent | Example 2 | | Example 3 | | Example 4 | |
|---|---|---|---|---|---|---|
| | Grams (g) | Concentration (wt. %) | Grams (g) | Concentration (wt. %) | Grams (g) | Concentration (wt. %) |
| Resin 1 | 320 | 47.4 | 320 | 47.3 | 320 | 47.2 |
| Resin 2 | 80 | 11.9 | 80 | 11.8 | 80 | 11.8 |
| Amide Accelerator | 40 | 5.9 | 40 | 5.9 | 40 | 5.9 |
| Calcium Carbonate Flakes | 225.72 | 33.5 | 225.72 | 33.4 | 225.72 | 33.3 |
| Curing Agent | 9 | 1.3 | 11 | 1.6 | 12 | 1.8 |
| Total | 674.72 | 100 | 676.72 | 100 | 677.72 | 100 |
| Test length (hours) | | 2 | | 2 | | 2 |
| Bearden Consistency | | 13 | | 16 | | 105 |
| Temperature (° C.) | | 72.8 | | 72.8 | | 72.8 |

As shown in Table 3, the LCM compositions of Examples 2-4 exhibited increasing Bearden Consistency with increasing amounts of curing agent added to the LCM composition at a test temperature (simulated formation temperature) of 72.8° C.

Examples 5: Effect of Reducing Calcium Carbonate Concentration on Thickening Time Tests for LCM Compositions In Example 5, the effect of reducing the amount of calcium carbonate on the final Bearden Consistency was investigated. Thickening time testing was conducted on an LCM composition having a lesser concentration of calcium carbonate flakes compared to the composition of Example 2. The LCM composition of Example 5 was prepared according to the preparation method previously described for Example 2. The thickening time test was conducted according to the test method described in Examples 2-4. The LCM compositions and thickening time test conditions and results for Example 5 and for Example 2 are provided subsequently in this disclosure in Table 4.

TABLE 5

Formulations and thickening time test results for the LCM composition of Example 5 in comparison to the LCM composition of Example 2

| Constituent | Example 2 | | Example 5 | |
|---|---|---|---|---|
| | Grams (g) | Concentration (wt. %) | Grams (g) | Concentration (wt. %) |
| Resin 1 | 320 | 47.4 | 320 | 49.6 |
| Resin 2 | 80 | 11.9 | 80 | 12.4 |
| Amide Accelerator | 40 | 5.9 | 40 | 6.2 |
| Calcium Carbonate Flakes | 225.72 | 33.5 | 196 | 30.4 |
| Curing Agent | 9 | 1.3 | 9 | 1.4 |
| Total | 674.72 | 100 | 645 | 100 |
| Test Length (hours) | | 2 | | 2 |
| Bearden Consistency | | 13 | | 59 |
| Pressure (psi) | | 5700 | | 5700 |
| Temperature (° C.) | | 72.8 | | 72.8 |

As shown in Table 5, reducing the amount of course calcium carbonate flakes in the LCM composition may increase the final Bearden Consistency, with all other variables constant. The reduction in final Bearden Consistency for Example 5 means that reducing the calcium carbonate flakes in the LCM composition may make the LCM compositions more difficult to pump and inject into the formation. Conversely, the results in Table 5 indicate that increasing the amount of calcium carbonate flakes may decrease the Bearden Consistency of the LCM compositions.

In a first aspect of the present disclosure, a lost circulation material (LCM) composition for sealing lost circulation zones in wellbores may comprise an epoxy resin comprising at least one of 2,3-epoxypropyl-o-tolyl ether, C12-C14 alkyl glycidyl ether, 1,6-hexanediol diglycidyl ether, butyl glycidyl ether, or cyclohexanedimethanol diglycidyl ether. The LCM composition may further include a curing agent, an amide accelerator, and calcium carbonate having an average particle size of from 1,000 microns to 10,000 microns.

A second aspect of the present disclosure may include the first aspect, in which the calcium carbonate may comprise calcium carbonate flakes.

A third aspect of the present disclosure may include either of the first or second aspects, comprising from 20 weight percent to 80 weight percent calcium carbonate based on the total weight of the LCM composition.

A fourth aspect of the present disclosure may include any of the first through third aspects, in which the calcium carbonate flakes may have an average particle size of from 4,000 microns to 10,000 microns.

A fifth aspect of the present disclosure may include any of the first through fourth aspects, in which the amide accelerator may comprise at least one of an amide, a polyamide, a tall oil fatty amide, a fatty polyamide, a carboxylic acid terminated fatty polyamide, a polyaminated fatty acid, an amidoamine, fatty amidoamine, a polyamidoamine, a polyolefin amide alkene amine, or combinations of these.

A sixth aspect of the present disclosure may include any of the first through fifth aspects, in which the amide accelerator may be a polyaminated fatty acid.

A seventh aspect of the present disclosure may include the sixth aspect, in which the polyaminated fatty acid may have the chemical formula (IX):

(IX)

where $R^8$ is a hydrocarbyl group and $R^9$ is a hydrocarbyl group or an alkylene carboxylate group having formula —$R^{10}$—COOH, where $R^{10}$ is a saturated or unsaturated hydrocarbylene.

An eighth aspect of the present disclosure may include any of the first through fifth aspects, in which the amide accelerator may comprise an amidoamine having the following chemical formula (VI):

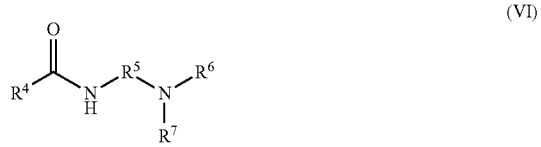
(VI)

where $R^4$ includes a saturated, unsaturated, or cyclic hydrocarbyl having from 3 to 20 carbon atoms, $R^5$ is a saturated, unsaturated, or cyclic hydrocarbyl having from 2 to 10 carbon atoms, $R^6$ is hydrogen or a hydrocarbyl having from 1 to 20 carbon atoms, and $R^7$ is hydrogen or a hydrocarbyl having from 1 to 20 carbon atoms.

A ninth aspect of the present disclosure may include any of the first through eighth aspects, in which the epoxy resin may further comprise bisphenol-A-epichlorohydrin epoxy resin.

A tenth aspect of the present disclosure may include any of the first through ninth aspects, in which the epoxy resin may comprise from 0.1 weight percent to 80 weight percent bisphenol-A-epichlorohydrin epoxy resin based on the total weight of the epoxy resins in the composition, and the epoxy resin further comprises a reactive diluent.

An eleventh aspect of the present disclosure may include any of the first through tenth aspects, in which the epoxy resin may comprise C12-C14 alkyl glycidyl ether and bisphenol-A-epichlorohydrin epoxy resin with the reactive diluent oxirane mono [($C_{12}$-$C_{14}$)-alkyloxy) methyl] derivatives.

A twelfth aspect of the present disclosure may include any of the first through tenth aspects, in which the epoxy resin may comprise bisphenol-A-epichlorohydrin epoxy resin, cyclohexanedimethanol diclycidyl ether, and butyl glycidyl ether.

A thirteenth aspect of the present disclosure may include any of the first through twelfth aspects, in which the curing agent may comprise at least one of at least one of trimethyl hexamethylene diamine (TMD), diethylenetriamine (DETA), triethylenetetramine (TETA), meta-xylenediamine (MXDA), aminoethylpiperazine (AEP), tetraethylenepentamine (TEPA), polyetheramine, isophoronediamine (IPDA), beta-hydroxyalkyl amide (HAA), diethyltoluenediamine (DETDA), polyoxypropylene diamine, or combinations of these.

A fourteenth aspect of the present disclosure may include any of the first through twelfth aspects, in which the curing agent may comprise at least one of diethylenetriamine, diethyltoluenediamine, polyoxypropylene diamine, or combinations of these.

A fifteenth aspect of the present disclosure may include any of the first through fourteenth aspects, further comprising a weighting material that may include at least one of sand, barite (barium sulfate), hematite, siderite, ilmenite, silica sand, manganese oxide (MnO), hausmanite (manganese tetraoxide ($Mn_3O_4$)), zinc oxide, zirconium oxide, iron oxide, fly ash, or any combination of these weighting materials.

A sixteenth aspect of the present disclosure may include any of the first through third aspects, in which the epoxy resin may comprise C12-C14 alkyl glycidyl ether and bisphenol-A-epichlorohydrin epoxy resin with the reactive diluent oxirane mono [($C_{12}$-$C_{14}$)-alkyloxy) methyl] derivatives, the curing agent may comprise diethylenetriamine, and the amide accelerator may comprise at least a carboxylic acid terminated fatty polyimide.

A seventeenth aspect of the present disclosure may include any of the first through sixteenth aspects, in which the LCM composition may comprise from 0.1 weight percent to 20 weight percent amide accelerator based on the total weight of the LCM composition before curing.

An eighteenth aspect of the present disclosure may include any of the first through seventeenth aspects, in which the LCM composition may comprise from 15 weight percent to 70 weight percent epoxy resin based on the total weight of the LCM composition before curing.

A nineteenth aspect of the present disclosure may include any of the first through eighteenth aspects, in which the LCM composition may comprise from 1 weight percent to 30 weight percent curing agent based on the total weight of the LCM composition before curing.

A twentieth aspect of the present disclosure may include any of the first through nineteenth aspects, in which the LCM composition may further comprise from 0.1 weight percent to 50 weight percent weighting material based on the total weight of the LCM composition.

A twenty-first aspect of the present disclosure may include any of the first through twentieth aspects, in which the LCM composition may have a density of from 1000 kilograms per cubic meter to 2600 kilograms per cubic meter.

A twenty-second aspect of the present disclosure may include any of the first through twenty-first aspects, in which the LCM composition may have a cure time of from greater than 0 hours to less than 48 hours.

A twenty-third aspect of the present disclosure may include a method of treating a lost circulation zone of a wellbore. The method may include injecting a lost circulation material (LCM) composition into the lost circulation zone. The LCM composition may include any of the LCM compositions of the first through twenty-second aspects. The method may further include curing the LCM composition in the lost circulation zone to produce a barrier operable to prevent wellbore fluids from passing into the lost circulation zone.

A twenty-fourth aspect of the present disclosure may include a method of treating a lost circulation zone of a wellbore, the method including injecting a lost circulation material (LCM) composition into the lost circulation zone.

The LCM composition may include an epoxy resin comprising at least one of 2,3-epoxypropyl-o-tolyl ether, C12-C14 alkyl glycidyl ether, 1,6-hexanediol diglycidyl ether, butyl glycidyl ether, cyclohexanedimethanol diglycidyl ether. The LCM composition may further include a curing agent, an amide accelerator, and calcium carbonate having an average particle size of from 1,000 microns to 10,000 microns. The method may further include curing the LCM composition in the lost circulation zone to produce a barrier operable to prevent wellbore fluids from passing into the lost circulation zone.

A twenty-fifth aspect of the present disclosure may include either one of the twenty-third or twenty-fourth aspects, in which the lost circulation zone may be a high-injectivity zone having a fluid loss rate of from 100 barrels per hour to 1000 barrels per hour.

A twenty-sixth aspect of the present disclosure may include any of the twenty-third through twenty-fifth aspects, in which the lost circulation zone may be a high-injectivity zone having an injectivity factor of less than or equal to 4000 pounds of force per square inch*min per barrel, in which a barrel is equal to 42 United States (U.S.) Gallons and the injectivity factor is defined as the quotient of the injection pressure in pounds of force per square inch divided by the injection rate in barrels per minute.

A twenty-seventh aspect of the present disclosure may include any of the twenty-third through twenty-sixth aspects, further comprising introducing a spacer fluid into the lost circulation zone before introducing the LCM composition.

A twenty-eighth aspect of the present disclosure may include any of the twenty-third through twenty-seventh aspects, further comprising introducing a displacement fluid after the LCM composition to displace the LCM composition into the lost circulation zone.

A twenty-ninth aspect of the present disclosure may include any of the twenty-third through twenty-eighth aspects, further comprising drilling through at least a portion of the barrier formed by the cured LCM composition to continue drilling the wellbore.

A thirtieth aspect of the present disclosure may include any of the twenty-fourth through twenty-ninth aspects, in which the calcium carbonate may include calcium carbonate flakes.

A thirty-first aspect of the present disclosure may include any of the twenty-fourth through thirtieth aspects, in which the calcium carbonate may have an average particle size of from 4,000 microns to 10,000 microns.

A thirty-second aspect of the present disclosure may include any of the twenty-fourth through thirty-first aspects, where the LCM composition may comprise from 20 weight percent to 80 weight percent calcium carbonate based on the total weight of the LCM composition.

A thirty-third aspect of the present disclosure may include any of the twenty-fourth through thirty-second aspects, in which the amide accelerator may comprise at least one of an amide, a polyamide, a tall oil fatty amide, a fatty polyamide, a carboxylic acid terminated fatty polyamide, an amidoamine, a polyaminated fatty acid, a fatty amidoamine, a polyamidoamine, a polyolefin amide alkene amine, or combinations of these.

A thirty-fourth aspect of the present disclosure may include any of the twenty-fourth through thirty-third aspects, in which the amide accelerator may comprise a polyaminated fatty acid.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates the contrary. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A lost circulation material (LCM) composition for sealing lost circulation zones in wellbores, the LCM composition comprising:
   an epoxy resin consisting of at least one of 2,3-epoxypropyl-o-tolyl ether, C12-C14 alkyl glycidyl ether, 1,6-hexanediol diglycidyl ether and combinations thereof;
   a curing agent;
   an amide accelerator;

calcium carbonate having an average particle size that enables the LCM compositions to be injected into the lost circulation zone and that increases the viscosity of the LCM composition after injection to block the pores of the lost circulation zone, wherein the average particle size of the calcium carbonate is from 1,000 microns to 10,000 microns.

2. The LCM composition of claim 1 in which the calcium carbonate comprises calcium carbonate flakes.

3. The LCM composition of claim 1 comprising from 20 weight percent to 80 weight percent calcium carbonate based on the total weight of the LCM composition.

4. The LCM composition of claim 2 in which the calcium carbonate flakes have an average particle size of from 4,000 microns to 10,000 microns.

5. The LCM composition of claim 1 in which the amide accelerator comprises at least one of an amide, a polyamide, a tall oil fatty amide, a fatty polyamide, a carboxylic acid terminated fatty polyamide, a polyaminated fatty acid, an amidoamine, fatty amidoamine, a polyamidoamine, a polyolefin amide alkene amine, or combinations of these.

6. The LCM composition of claim 1 in which the amide accelerator is a polyaminated fatty acid.

7. The LCM composition of claim 6 in which the polyaminated fatty acid has the chemical formula (IX):

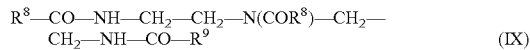
(IX)

where $R^8$ is a hydrocarbyl group and $R^9$ is a hydrocarbyl group or an alkylene carboxylate group having formula —$R^{10}$—COOH, where $R^{10}$ is a saturated or unsaturated hydrocarbylene.

8. The LCM composition of claim 1 further comprising bisphenol-A-epichlorohydrin epoxy resin.

9. The LCM composition of claim 8 further comprising a reactive diluent comprising oxirane mono [(C12-C14)-alkyloxy) methyl] derivatives.

10. The LCM composition of claim 1 in which the curing agent comprises at least one of at least one of trimethyl hexamethylene diamine (TMD), diethylenetriamine (DETA), triethylenetetramine (TETA), meta-xylenediamine (MXDA), aminoethylpiperazine (AEP), tetraethylenepentamine (TEPA), polyetheramine, isophoronediamine (IPDA), beta-hydroxyalkyl amide (HAA), diethyltoluenediamine (DETDA), polyoxypropylene diamine, or combinations of these.

11. The LCM composition of claim 1 comprising from 0.1 weight percent to 20 weight percent amide accelerator based on the total weight of the LCM composition before curing.

12. The LCM composition of claim 1 comprising from 15 weight percent to 70 weight percent epoxy resin based on the total weight of the LCM composition before curing.

13. The LCM composition of claim 1 comprising from 1 weight percent to 30 weight percent curing agent based on the total weight of the LCM composition before curing.

14. A method of treating a lost circulation zone of a wellbore, the method comprising:
    injecting the lost circulation material (LCM) composition of claim 1 into the lost circulation zone; and
    curing the LCM composition in the lost circulation zone to produce a barrier operable to prevent wellbore fluids from passing into the lost circulation zone.

15. The method of claim 14 where the LCM composition comprises from 20 weight percent to 80 weight percent calcium carbonate based on the total weight of the LCM composition.

16. The method of claim 14 in which the lost circulation zone is a high-injectivity zone having a fluid loss rate of from 100 barrels per hour to 1000 barrels per hour or an injectivity factor of less than or equal to 4000 pounds of force per square inch * min per barrel, in which a barrel is equal to 42 United States (U.S.) Gallons and the injectivity factor is defined as the quotient of the injection pressure in pounds of force per square inch divided by the injection rate in barrels per minute.

17. The method of claim 14 further comprising introducing a spacer fluid into the lost circulation zone before introducing the LCM composition.

18. The method of claim 14 further comprising introducing a displacement fluid after the LCM composition to displace the LCM composition into the lost circulation zone.

19. The method of claim 14 further comprising drilling through at least a portion of the barrier formed by the cured LCM composition to continue drilling the wellbore.

* * * * *